United States Patent
Hu et al.

(10) Patent No.: US 12,353,211 B1
(45) Date of Patent: Jul. 8, 2025

(54) SYSTEM FOR MOVEMENT OUTSIDE OF SENSOR FIELD OF VIEW BY AN AUTONOMOUS MOBILE DEVICE

(71) Applicant: AMAZON TECHNOLOGIES, INC., Seattle, WA (US)

(72) Inventors: Yue Hu, San Francisco, CA (US); Jong Jin Park, Sunnyvale, CA (US); Daimian Wang, Fremont, CA (US); Roopesh Athipatla Pattabhi, Newark, CA (US); Jingyu Qiao, Milpitas, CA (US); Changsheng Shen, Mountain View, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 474 days.

(21) Appl. No.: 17/447,136

(22) Filed: Sep. 8, 2021

(51) Int. Cl.
| | |
|---|---|
| G05D 1/00 | (2024.01) |
| B60W 60/00 | (2020.01) |
| G01S 13/89 | (2006.01) |
| G01S 15/89 | (2006.01) |
| G01S 17/894 | (2020.01) |

(52) U.S. Cl.
CPC ........ G05D 1/0214 (2013.01); B60W 60/0015 (2020.02); G01S 13/89 (2013.01); G01S 15/89 (2013.01); G01S 17/894 (2020.01); G05D 1/0246 (2013.01)

(58) Field of Classification Search
CPC .... G05D 1/0214; G05D 1/0246; G01S 13/89; G01S 15/89; G01S 17/894; B60W 60/0015

USPC .......................................................... 701/26
See application file for complete search history.

(56) References Cited

U.S. PATENT DOCUMENTS

| | | | |
|---|---|---|---|
| 2017/0080565 | A1 | 3/2017 | Dalibard et al. |
| 2019/0121361 | A1* | 4/2019 | Afrouzi ................ G01C 21/165 |
| 2019/0196480 | A1* | 6/2019 | Taylor .................. G05D 1/0223 |
| 2020/0225673 | A1* | 7/2020 | Ebrahimi Afrouzi .... G06N 5/04 |
| 2021/0146540 | A1 | 5/2021 | Kim et al. |
| 2024/0028049 | A1* | 1/2024 | Tojima ................... G06Q 10/08 |

OTHER PUBLICATIONS

Jones, Jodi Marie, "Non-final Office Action dated Sep. 6, 2023", U.S. Appl. No. 17/447,155, The United States Patent and Trademark Office, Sep. 6, 2023.

* cited by examiner

*Primary Examiner* — Marc Burgess
*Assistant Examiner* — John D Holman
(74) *Attorney, Agent, or Firm* — Lindauer Law, PLLC

(57) ABSTRACT

An autonomous mobile device (AMD) may move around a physical space while performing tasks. The AMD may have sensors with a field of view (FOV) facing forward. As the AMD moves forward, a safe region is determined based on data from those forward-facing sensors. The safe region describes a geographical area that is clear of obstacles during recent travel. If the AMD moves outside of the FOV, such as moving backwards, a check is made as to whether the AMD remains within the safe region. If a portion of the AMD moves beyond the safe region, the AMD stops. This prevents the AMD from colliding with obstacles that are outside of the safe region and also outside of the FOV while moving.

20 Claims, 11 Drawing Sheets

SYSTEM FOR MOVEMENT OUTSIDE OF SENSOR FIELD OF VIEW BY AN AUTONOMOUS MOBILE DEVICE

BACKGROUND

Every day, a user faces a variety of tasks both personal and professional that need to be attended to. These may include helping in the care of others, such as children or the elderly, working from home, taking care of the home, staying in contact with others, and so forth. Devices that assist in these tasks may help the user perform these tasks better or may allow the user time to attend to other tasks.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
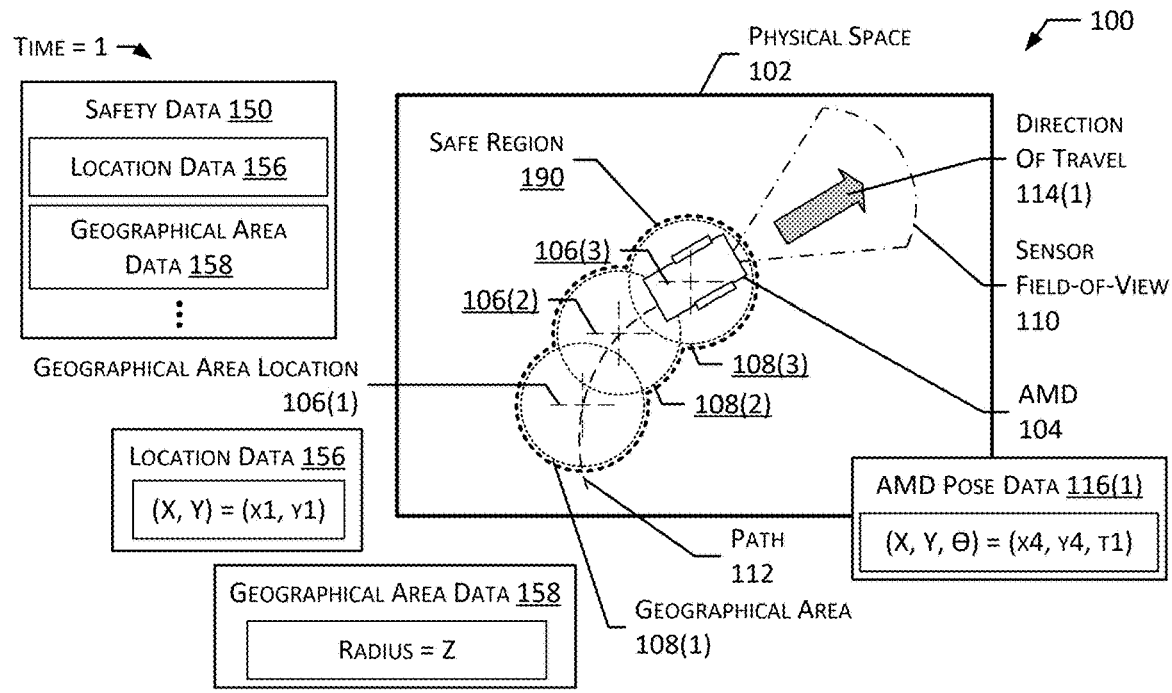
FIG. 1 illustrates a system for safe movement outside of a sensor field-of-view by an autonomous mobile device (AMD), according to some implementations.
Figure 1:
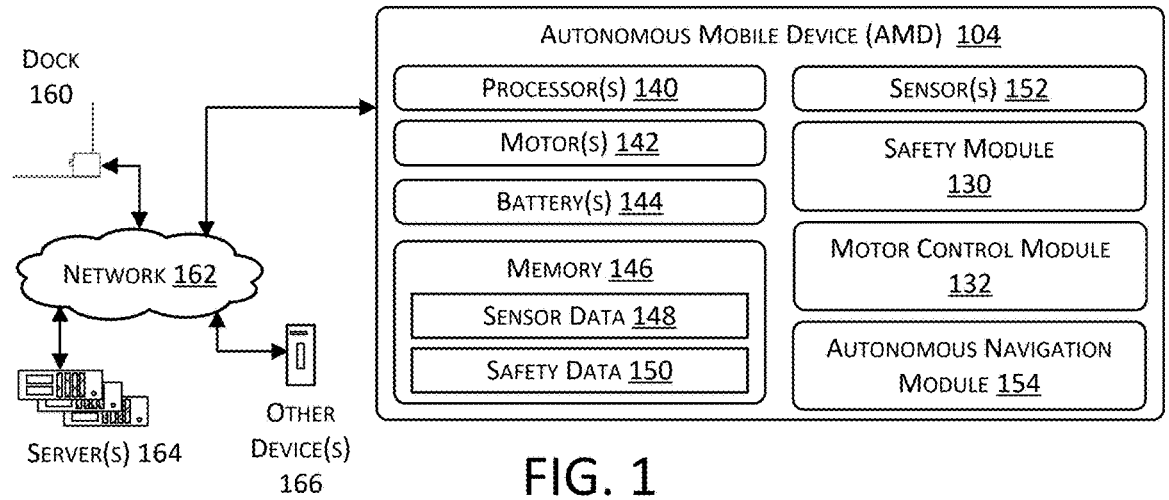

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) may move from one location in a physical space to another location without being controlled by a user. A user may interact with the AMD, and the AMD may perform tasks that involve moving in the physical space, displaying information, accepting input, and so forth. Movement within the physical space involves avoiding obstacles. Obstacles may be determined using sensor data acquired by one or more sensors having fields-of-view (FOV) that include physical areas around the AMD.

Traditionally, movement of a robot involves using sensor data to avoid obstacles. As a result, a traditional system either involves having sensors with FOVs that are pointed in the various directions the robot can move, or moving the robot to point the FOV in the proposed direction of travel. For example, a traditional robot may have forward sensors with FOVs pointing forward to detect obstacles during forward motion and rear sensors with FOVs pointing backward to detect obstacles while backing up. However, this involves adding sensors that are expensive, infrequently used, and may impose additional computational requirements. One technique to remedy this is to use sensors with only forward sensors and a physical design of the robot that allows it to turn within its own footprint. For example, if the robot needs to move backwards it would turn within its own footprint and point the FOV in the intended direction of travel. However, this results in additional steps and time to perform the turn and limits the physical design of the robot. For example, if the robot does not turn within its own footprint, during a turn it may collide with a nearby obstacle.

Described in this disclosure are techniques to use sensor data acquired while moving in the physical space to maintain a safe region. The safe region comprises a set of geographical areas near the AMD that were recently observed to be clear of obstacles and deemed safe for movement. The safe region may be determined as the AMD moves, based on sensor data from within the field of view (FOV) of the sensors. For example, within a physical space, the AMD may move forward along a path. As the AMD moves forward, the geographical area through which the AMD moves may be considered to be clear of obstacles, as are the geographical areas observed by the sensors free from obstacles. The safe region is an aggregate of these geographical areas that are accumulated over time, distance, or both.

Different techniques may use the safe region to ensure safe movement of the AMD in a direction that is outside of the FOV. For example, if the AMD is moving in a direction that the sensors cannot currently "see", such as moving backwards, the use of the safe region prevents the AMD from interacting with a previously observed obstacle such as an obstruction or a cliff.

With a first technique, during movement in a direction that is outside of the FOV, a safety module checks that portions associated with a structure of the AMD remain inside the safe region. If the portion of the structure has moved outside of the safe region, the safety module stops movement of the AMD. Using this first technique, the safety module determines whether the AMD is within the safe region during movement.

With a second technique, the safety module may be used independently of an autonomous navigation module. For example, the autonomous navigation module may use an occupancy map to determine a path for the AMD. In this example, before the AMD moves in a direction that is outside the sensor FOV, the safety module determines whether a move in a direction outside of the sensor FOV would result in the AMD moving outside of the safe region.

With a third technique, the AMD may determine a path, based on both an occupancy map and the safe region, that keeps movement of the AMD that is outside of the FOV within the safe region. In the second technique, the safety module may determine safety of a move before the move is made. In contrast, in the third technique, the safe region may be used to determine a set of poses associated with a path that result in the AMD staying within the safe region. A path may be associated with a set of one or more poses from the set of poses. In some examples, after the AMD moves, the safety module may continue to determine whether the move has resulted in the AMD moving outside of the safe region.

In the course of performing a task, the AMD may receive a command or determine a circumstance that results in the AMD determining to move into a geographical area that is outside the current FOV of the sensors. For example, the AMD may be moving forward and receives an instruction that requires turning around. The AMD may do so, using the safe region to avoid leaving the geographical area previously deemed to be free of obstacles, reducing the likelihood of a collision during a reverse, turn, or movement in a geographical area outside of the FOV of the sensors.

The techniques disclosed increase the safety of movement by the AMD in a physical space in a direction that may be outside the current FOV. These techniques are also very low latency, allowing fast response times. This facilitates safe operation and avoids the added expense of infrequently used sensors. These techniques also remove limitations on physical design of the AMD, allowing designs of AMD structure that do not rotate within their own footprint.

Illustrative System

FIG. 1 illustrates a system 100 for safe movement outside a sensor field-of-view by an autonomous mobile device (AMD), according to some implementations.

In this example, at a first time, time=1, the AMD 104 travels forward with the use of sensor data and an occupancy map. An occupancy map is described below. As the AMD 104 travels in a direction within a sensor field-of-view 110, a safe region 190 comprising a set of geographical areas is determined to be clear of obstacles that may obstruct travel. For clarity of illustration and not necessarily as a limitation, the safe region 190 is depicted as slightly larger than the set of geographical areas. At a second time, time=2, the AMD 104 may determine an instruction to move in a direction outside the sensor FOV. Further, at the second time, the AMD 104 may use the safe region 190 to safely move in a direction outside the sensor FOV. To determine that the AMD 104 is moving safely while moving in a direction outside the sensor FOV, the AMD 104 determines whether one or more portions of the AMD 104 have moved outside of any of the geographical areas of the safe region. If the AMD 104 has one or more portions outside of any of the geographical areas of the safe region, the AMD 104 may stop movement. In some examples, the AMD 104 may move forward by an amount that moves the one or more portions of the AMD 104 within a geographical area of the safe region. In this example, after moving into a geographical area within the safe region, the AMD 104 may again begin to move in a direction outside the sensor FOV while attempting to stay within the safe region.

The AMD 104 is depicted within a physical space 102. The AMD 104 may include one or more processors 140, one or more motors 142, one or more batteries 144, memory 146, one or more sensors 152, a safety module 130, a motor control module 132, and an autonomous navigation module 154. The memory 146 may include sensor data 148 and safety data 150. The safety data 150 may comprise data indicative of one or more geographical areas that are safe for traversal.

The safety data 150 may comprise, for each respective geographical area of the safety region, respective location data and respective geographical area data. For example, for a first geographical area of the safety region, the safety data 150 may comprise location data 156 and geographical area data 158. The first geographical area, and each geographical area of the safe region, may be representative of a geographical area of the physical space 102. The location data 156 may indicate a first geographical area location 106(1). The geographical area data 158 may indicate a geographical area 108 of the first geographical area 108(1). The first geographical area location 106(1) may by represented by an (X, Y) coordinate. The first geographical area location 106(1) coordinate may be specified relative to a fixed origin or relative to another geographical area of the safe region. In some examples, a fixed origin may be a location of a dock 160 or may be a location of a feature of the physical space 102, such as a corner of a particular room. The (X, Y) coordinate may be with respect to a plane associated with a floor surface of the physical area 102.

In this example, as the AMD 104 moves along a path 112, the safety module 130 may determine geographical areas to include within the safe region. In some implementations, the safe region 190 may include a number of geographical areas associated with a distance traveled by the AMD 104. For example, the safety module 130 may determine a geographical area to include within the safe region 190 after traveling a first threshold distance. The safety module 130 may continue to determine geographical areas to include within the safe region 190 after every X meters traveled, where X is equal to the first threshold distance. In some examples, the first threshold distance may be based on a length that allows consecutive geographical areas of the safe region 190 to provide a passable geographical area during movement outside a sensor field-of-view 110 of the AMD 104.

For example, the first threshold distance is smaller than a distance that results in two consecutive geographical areas having an overlapping area that is smaller than an area through which the AMD 104 may travel while not having any portion of the AMD 104 be outside of the overlapping geographical areas. As one example, X may be greater than r and less than 1.5r, where r is equal to a radius of the circular geographical area. In some examples, r may be specified such that r>(W÷2)+Y, where Y is a buffer region, and where W is a width of the AMD 104. In some examples, Y may be 20 centimeters (cm), but may be greater than or less than 20 cm in other examples. In some examples, the geographical area may be at least as large as a footprint of the AMD 104, where the footprint of the AMD 104 may be indicated by a floor surface area that includes a perimeter of the AMD 104. As one example, the AMD 104 may occupy a geographical area indicated by a width of the AMD and a length of the AMD, where each geographical area of the safe region 190 at least encompasses the geographical area occupied by the AMD. The AMD 104 may comprise a structure. For example, the structure may comprise a chassis, an external housing, one or more wheels, or attachments that are fixed to the structure or extensible from the structure. An attachment may include a storage bay, a mechanical arm, a moveable display, and so forth. In this example, the footprint of the AMD 104 may be indicated by a footprint of the structure. The footprint of the AMD 104 may include one or more of the above-described attachments. In this example, the AMD 104 may occupy a geographical area of the physical space that is associated with the footprint of the structure.

In some implementations, a size of a safe region 190 may be based on the speed the AMD 104 is traveling. For example, a safe region 190 may comprise a set of geographical areas, and a size of a geographical area of the safe region 190 may be dynamically resized based on a speed of the AMD 104. In this example, if a given geographical area of the safe region 190 is circular and specified by a radius r, then the given geographical area may be determined based on a speed of the AMD. As one example, the AMD 104 may be moving at 1.0 meters per second (m/s), and the AMD 104 moving at 1.0 m/s may take 2 centimeters (cm) to come to a complete stop. Stopping distances may be determined experimentally. For example, at a maximum speed at a first time, the AMD 104 may be instructed to come to a stop. At a second time, the AMD 104 may be stopped. The distance traveled by the AMD 104 from the first time to the second time may be a maximum stopping distance. Similarly, different stopping distances at different speeds may be determined.

In this example, a size of a given geographical area of a safe region 190 may be based on an area size of (r-B). B may be a distance to come to a complete stop given a moving speed of S m/s. As the moving speed, S, increases, the stopping distance, B, may also increase and the area size indicated by (r-B) decreases. Similarly, as the moving speed decreases the stopping distance decreases, and the area size indicated by (r-B) increases. In some implementations, as described below with respect to FIG. 5, a size of a footprint for the AMD 104 may be based on a speed of the AMD 104 as it moves within the safe region. For example, as the AMD 104 moves faster, a footprint used to determine whether the AMD 104 is within a safe region 190 may be determined to be larger based on the AMD 104 having a larger stopping distance at faster speeds. Similarly, as the AMD 104 moves slower, a footprint used to determine whether the AMD is within the safe region 190 may be smaller based on the AMD 104 having a smaller stopping distance at slower speeds. In the following examples, the safety module 130 may use one or more locations within the footprint that may be associated with different portions of the AMD 104, such as a front, rear, wheels, attachments, sides, and so forth.

The safe region 190 may be updated as the AMD 104 moves to contain those most recently traveled geographical areas, with new geographical areas being added and old geographical areas being removed from the safe region. For example, geographical areas within the safe region 190 that are farther than a second threshold distance from the AMD 104 may be excluded or removed from the safe region. For example, a first geographical area may be located at a first location. After the AMD 104 has traveled more than the second threshold distance away from the first location, the safety module 130 may exclude or remove the first geographical area from the safe region. In some examples, the second threshold distance may be based on the accuracy of motor encoder data usable to determine a relative location from the AMD 104 to the first location.

The safe region 190 may be updated over time, with geographical areas having older timestamps being removed from the safe region. For example, geographical areas within the safe region 190 may be excluded or removed from the safe region 190 if more than a first threshold time period has passed since a time when the first geographical area was included within the safe region. A first geographical area may be determined at a first time. After a time period greater than the first threshold time period has elapsed since the first time, the safety module 130 may exclude or remove the first geographical area from the safe region. The safety module 130 may exclude or remove the first geographical area after the first threshold time period since the first time whether or not the AMD 104 has moved since the first time. In some examples, a plurality of geographical areas may be determined as the AMD 104 travels forward, and each respective geographical area may be associated with a respective timestamp. The safety module 130 may determine, based on a given timestamp for a given geographical area being determined within the threshold time period, to include the given geographical area in the safe region 190 when the safety module 130 uses the safe region.

The safe region 190 may also be updated in response to situations that may introduce uncertainty to the safe region. For example, the safety module 130 may reset the safe region 190 to remove or exclude all geographical areas. If the AMD 104 is unable to determine localization data above a confidence threshold, then the safety module 130 may remove or exclude all geographical areas of the safe region 190 based on uncertainty of the AMD 104 location relative to the geographical areas of the safe region. Localization data may be lost or determined to be below the confidence threshold if the AMD 104 is tipped over, lifted, or pushed. The safety module 130 may add geographical areas to the safe region 190 after the AMD 104 begins moving forward after localization data is determined above the confidence threshold. As another example, if the AMD 104 is lifted or physically moved, then the relative locations of the safe region 190 may no longer be reliable, and the safety module 130 may reset the safe region 190 to remove or exclude all geographical areas that were previously determined.

In this example, at the first time, time=1, the AMD 104 is within a physical space 102 at a location indicated by pose data 116(1). The pose data 116(1) may indicate a location using (X, Y) coordinates relative to an origin location, such as a dock 160, or such as some fixed object in the physical space 102. Similarly, pose data 116(1) may indicate an orientation relative to an origin, such as the dock 160, or relative to a fixed object in the physical space 102, such as a particular wall. To determine a distance to a geographical area location, a location of the AMD 104 may be used. The AMD 104 location may be specified with respect to a single portion of the AMD 104, such as a center of mass, or with respect to an intersection of multiple portions of the AMD 104, as discussed with respect to FIG. 4.

At the first time, the AMD 104 may have traveled along a path 112, and the safety module 130 has determined a safe region. In this example, the safe region 190 includes three geographical areas, and location data and area data for each of the three geographical areas are indicated by safety data 150. In this example, the safe region 190 includes a first geographical area 108(1), a second geographical area 108(2), and a third geographical area 108(3). In other examples, the safe region 190 may include more or fewer geographical areas. In this example, the first geographical area 108(1) is located at a first geographical area location 106(1), the second geographical area 108(2) is located at a second geographical area location 106(2), and the third geographical area 108(3) is located at a third location 106(3). In this example, each geographical area of the safe region 190 is circular, and a given geographical area is indicated by a radius value. In other examples, a geographical area may be specified by a polygon, one or more polygons, an oval, another geometric shape, or combination of geometric shapes. In this example, location data 156 indicates the first geographical area location 106(1), and geographical area data 158 indicates the first geographical area 108(1). Similar location data 156 and geographical area data 158 may be determined for each geographical area of the safe region, and the safety data 150 may include location data 156 and geographical area data 158 for each geographical area of the safe region.

Continuing this example, a first distance between the first location 106(1) and the second location 106(2) may be determined by using the Pythagorean theorem. For example, if the first location 106(1) is indicated by $(x_1, y_1)$, and the second location 106(2) is indicated by $(x_2, y_2)$, then the first distance, $D_1$, is indicated by:

$$D_1 = \sqrt{(x_2-x_1)^2 + (y_2-y_1)^2} \qquad \text{(Equation 1)}$$

As indicated above, a distance between each consecutive geographical area of the safe region 190 may be equal to, or approximately equal to, the first threshold distance.

In this example, at the first time, the AMD 104 is traveling in a first direction, indicated by direction of travel 114(1). At the first time, the AMD 104 is at a location and orientation indicated by pose data 116(1). During movement outside a sensor field-of-view 110, pose data may be used to determine whether one or more portions of the AMD 104 are outside any of the geographical areas within the safe region.

During forward movement, the AMD 104 may use one or more sensors 152 to determine whether there may be obstacles that obstruct further forward movement. The one or more sensors 152 may include one or more sensors with individual fields-of-view. The sensor field-of-view 110 may include geographical areas of the physical space 102 that are in the first direction of travel 114(1). More generally, if the AMD 104 comprises one or more sensors 152 in a given direction of movement, the safety module 130 may determine geographical areas to include in the safe region 190 as the AMD 104 travels in the given direction. The safe region 190 may then be used as the AMD 104 moves in any direction that is outside of a sensor field-of-view 110.

The individual fields-of-view may comprise the sensor field-of-view 110. A field-of-view may comprise an effective sensor range for a sensor. An effective sensor range may include a portion of the physical space 102 that is associated with sensor data that is above a confidence threshold. The one or more sensors 152 may be fixed, with respect to the AMD 104, or may be movable with respect to the AMD 104. The memory 146 may include an occupancy map, sensor data 148, and safety data 150. The occupancy map may be based on first occupancy data determined using active sensors and second occupancy data using passive sensors. Occupancy data may indicate whether a cell in an occupancy map is indicative of a physical area associated with the cell being occupied by an object in the physical space 102. In some implementations, an indication of occupancy may be a probability value, ranging from zero to one. In other implementations, an indication of occupancy may be a first value for occupied, a second value for unoccupied, and a third value for unknown.

In this example, while the AMD 104 is traveling in the first direction, the AMD 104 may determine an instruction to move in a second direction. For example, the AMD 104 may receive a command from a user or a device to stop and move in the second direction. As another example, the AMD 104 may encounter an obstacle and may not have sufficient space in which to rotate or turn around. In some examples, the center of rotation of the AMD 104 may be offset from a geometric center of a perimeter of the AMD 104. For example, to rotate in the second direction, one or more portions of the AMD 104 may move outside of the perimeter of the AMD 104.

The instruction to move in the second direction may be part of multiple instructions to move the AMD 104 in the second direction. As discussed above, the AMD 104 may use an occupancy map to determine a path. In this example, the AMD 104 may determine a path using the occupancy map and begin moving in the second direction that is outside the sensor FOV 110. In this example, the second direction of travel 114(2) may be a direction that is outside of the sensor field-of-view 110. The second direction of travel 114(2) may be outside of the sensor field-of-view 110 because of a lack of sensors 152 with fields-of-view in the second direction, because of sensor malfunction, or some other reason.

At a second time, time=2, the AMD 104 may be moving in the second direction of travel 114(2). At the second time, the AMD 104 may be at a location and orientation indicated by pose data 116(2). As discussed in greater detail with respect to FIG. 4, the pose data 116(2) may be used to calculate one or more locations being occupied by the AMD 104. The one or more locations being occupied by the AMD 104 may be used to determine whether a portion of the AMD 104 is outside any of the geographical areas within the safe region. If the AMD 104 has moved outside of any of the geographical areas within the safe region, the safety module 130 may determine to stop movement of the AMD 104. In some examples, the AMD 104 may move forward by a distance that moves the one or more portions of the AMD 104 within a geographical area of the safe region. Continuing this example, after moving into a geographical area within the safe region, the AMD 104 may again begin to move in a direction outside the sensor FOV 110 while attempting to stay within the safe region.

In some implementations, the autonomous navigation module 154 may use the safe region 190 to determine a path plan for movement outside a sensor field-of-view 110. For example, the autonomous navigation module 154 may determine, based on the safe region, a path from the first location to a second location that prevents one or more portions of the AMD 104 from moving outside the safe region 190 during movement outside a sensor field-of-view 110. As described with respect to FIGS. 4-7, the safety module 130 may determine for a given AMD pose, whether a portion of the AMD 104 is outside of the safe region. The autonomous navigation module 154 may determine a set of poses comprising a path plan and determine whether each pose of the set of poses results in the AMD 104 moving outside of the safe region. In this example, if a first pose of the set of poses results in the AMD 104 moving outside of the safe region, the autonomous navigation module 154 replaces the first pose resulting in the AMD 104 moving outside of the safe region 190 with one or more poses, before or after the first pose, that do not result in the AMD 104 moving outside of the safe region. As a result, the AMD 104 determines a set of poses that maintain the structure of the AMD 104 within the one or more geographical areas of the safety region.

The one or more sensors 152 may comprise a time-of-flight (TOF) depth camera, sonar, radar, LIDAR (light detection and ranging/laser imaging, detection, and ranging), ultrasonic, or other types of sensors that emit and measure different types of signals. Depth sensors such as ultrasonic sensors, optical sensors such as a TOF depth camera, LIDAR, radar, and so forth, may provide sensor data 148 that is indicative of the presence or absence of objects in the physical space 102 within the sensor field-of-view 110. The sensor field-of-view 110 may be the field-of-view of a single sensor 152 or a combined field-of-view of multiple sensors 152.

The AMD 104 may dock in or connect to a dock 160. The dock 160 may provide external power which the AMD 104 may use to charge a battery 144 of the AMD 104. The dock 160 may also provide a fixed origin and reference location for localization data usable to determine locations and orientations of the AMD 104.

The AMD 104 may include battery(s) 144 to provide electrical power for operation of the AMD 104. The battery(s) 144 may be rechargeable, allowing storage of electrical energy obtained from an external source. In other implementations, a wireless power receiver may be used to provide power for operation of the AMD 104, recharge the battery(s) 144, and so forth.

One or more motors 142 or other actuators enable the AMD 104 to move from one location in the physical space 102 to another. For example, a motor 142 may be used to drive a wheel attached to a chassis of the AMD 104, which causes the AMD 104 to move. The AMD 104 may turn, move forward, move backward, and so forth. In another example, actuators may move mechanical legs allowing the AMD 104 to walk.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 includes one or more memories 146. The memory 146 may comprise one or more non-transitory computer-readable storage media (CRSM).

The AMD 104 may include one or more sensors 152. For example, the sensors 152 may include microphones, time-of-flight (TOF) sensors cameras, LIDAR, inductive sensors, and so forth. The sensors 152 may generate sensor data 148 and the inductive sensors may generate signal data indicative of measured signal strength. The sensors 152 are discussed in more detail with regard to FIG. 3.

The AMD 104 may use network interfaces to connect to a network 162. For example, the network 162 may comprise a wireless local area network, that in turn is connected to a wide area network such as the Internet. The dock 160 may also be connected to the network 162. For example, the dock 160 may be configured to connect to the wireless local area network 162 such that the dock 160 and the AMD 104 may communicate.

The AMD 104 may access one or more servers 164 via the network 162. For example, the AMD 104 may utilize a wakeword detection module to determine if a user is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user to one or more servers 164 for further processing. The servers 164 may process the spoken audio and return to the AMD 104 data that may be subsequently used to operate the AMD 104.

The AMD 104 may also communicate with other devices 166. The other devices 166 may include one or more devices that are within the physical space 102 such as a home or associated with operation of one or more devices in the physical space 102. For example, the other devices 166 may include a doorbell camera, a garage door opener, a refrigerator, washing machine, and so forth. In some implementations the other devices 166 may include other AMDs 104, vehicles, and so forth.

Figure 2:
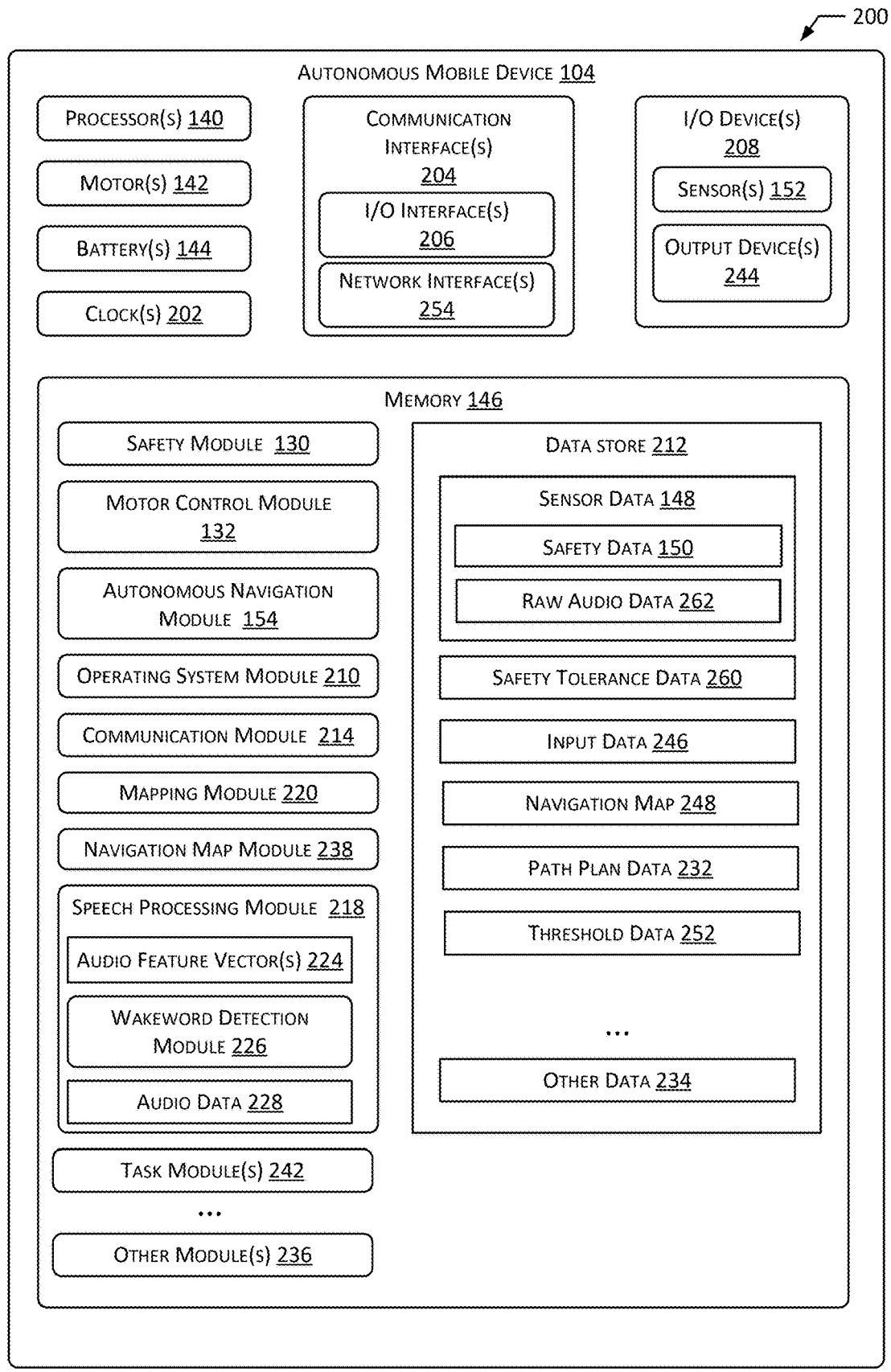
FIG. 2 is a block diagram of the components of the AMD, according to some implementations.

FIG. 2 is a block diagram 200 of the components of the AMD 104, according to some implementations.

The AMD 104 may include one or more batteries 144 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

The AMD 104 may include one or more network interfaces 254. The network interfaces 254 may include devices to connect to personal area networks (PANs), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth.

During operation, the AMD 104 may determine input data 246. The input data 246 may include or be based at least in part on sensor data 148 from the sensors 152 onboard the AMD 104. In one implementation, a speech processing module 218 may process raw audio data 262 obtained by a microphone on the AMD 104 and produce input data 246. For example, a user may say "robot, come here" which may produce input data 246 "come here". In another implementation, the input data 246 may comprise information such as a command provided by another computing device, such as a smartphone or tablet computer.

A mapping module 220 determines a representation of the physical space 102 that includes obstacles and their locations in the physical space 102. During operation, the mapping module 220 uses the sensor data 148 from various sensors 152 to determine information such as where the AMD 104 is, how far the AMD 104 has moved, the presence of obstacles, where those obstacles are, and so forth.

The mapping module 220 uses a simultaneous localization and mapping (SLAM) module. Localization is determining where the AMD 104 is in the physical space 102 and may utilize some external reference. For example, cameras may determine images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

While the AMD 104 is moving, the SLAM module may provide as output a set of poses, each pose describing a location and orientation in the physical space 102. Each pose is based at least in part on the apparent motion of observed features in the images. For example, from image to image at least some of the features that are described by descriptors will be in common. By determining the relative difference in apparent position in the image of the same feature as observed by two different cameras at the same time, the location of the camera with respect to the feature in the physical space 102 may be determined. At successive times, and as the AMD 104 moves and additional images are determined from locations in the physical space 102, the apparent change in position of the same feature across the additional images may be used to determine subsequent poses. In some implementations, an orientation may comprise information about six dimensions (6D), that of three orthogonal axes and corresponding rotations about those axes.

The SLAM module may also use data from other sensors 152 such as motor encoders, inertial measurement units (IMU) with one or more accelerometers and gyroscopes, and so forth. An IMU may comprise a tilt sensor. For example, inertial data indicative of rotations, accelerations along particular axes, and so forth obtained from the IMU may be integrated to provide information about the movement of the AMD 104.

A set of poses generated by the SLAM module over time may describe a given AMD 104 trajectory. For example, trajectory data may comprise a time series of pose data from the SLAM module.

While the AMD 104 is operating, the sensors 152 may be used to determine sensor data 148 comprising information about the physical space 102. In addition to cameras, the AMD 104 may include depth sensors that may determine depth data about the presence or absence of obstacles in the physical space 102, and so forth. For example, the sensors 152 may comprise active sensors, such as time-of-flight (TOF) depth camera, ultrasound, radar, and so forth. The depth data is indicative of whether an obstacle is detected or not and includes information about the distance between the sensor 152 and the obstacle and the relative direction with respect to the sensor 152 of an obstacle, if detected.

The sensor data 148 may be processed to determine occupancy data. The occupancy data is indicative of a particular area in the physical space 102, relative to the pose of the AMD 104 at the time the sensor data 148 was determined, and whether that area contains an obstacle or is determined to be free from obstacles.

An occupancy map may be manually or automatically determined as part of an exploration process. This exploration may include an explicit exploration in which the AMD 104 moves through the physical space 102 or may be incidental exploration to movement of the AMD 104. For example, explicit exploration may involve the AMD 104 starting with no occupancy map and moving throughout the physical space 102 to determine occupancy data and the corresponding occupancy map. In another example, incidental exploration may involve the AMD 104 following the user. Continuing the example, during a learning phase the user may take the AMD 104 on a tour of the physical space 102, allowing the mapping module 220 of the AMD 104 to determine occupancy data and the corresponding occupancy map. The user may provide input data 246 such as tags or other semantic data that designates a particular obstacle type, such as "furniture" or "fragile". In another example, during subsequent operation, the AMD 104 may generate the occupancy map that is indicative of locations and types of obstacles such as chairs, doors, stairwells, and so forth as it moves unattended through the physical space 102.

Modules described herein, such as the mapping module 220, may provide various processing functions such as de-noising, filtering, and so forth. Processing of sensor data 148, such as image data from a camera, may be performed by a module implementing, at least in part, one or more of the following tools or techniques. In one implementation, processing of image data may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 148. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 148 or other data. For example, the ANN may be trained using a supervised learning algorithm such that object identifiers are associated with images of particular objects within training images provided to the ANN. Once trained, the ANN may be provided with the sensor data 148 and produce output indicative of the object identifier.

A navigation map module 238 uses the occupancy map as input to generate a navigation map 248. For example, the navigation map module 238 may produce the navigation map 248 by inflating or enlarging the apparent size of obstacles as indicated by the occupancy map.

The AMD 104 autonomous navigation module 154 may generate path plan data 232 that is indicative of a path through the physical space 102 from the current location to a destination location. The AMD 104 may then begin moving along the path.

While moving along the path, the AMD 104 may assess the physical space 102 and update or change the path as appropriate. For example, if an obstacle appears in the path, the mapping module 220 may determine the presence of the obstacle as represented in the occupancy map and navigation map 248. The now updated navigation map 248 may then be used to plan an alternative path to the destination location.

The AMD 104 may utilize one or more task modules 242. The task module 242 comprises instructions that, when executed, provide one or more functions. The task modules 242 may perform functions such as finding a user, following a user, presenting output on output devices 244 of the AMD 104, performing sentry tasks by moving the AMD 104 through the physical space 102 to determine the presence of unauthorized people, and so forth.

The AMD 104 includes one or more output devices 244, such as one or more of a motor 142, light, speaker, display, projector, printer, and so forth. The one or more output devices 244 may be used to provide output during operation of the AMD 104. The output devices 244 are discussed in more detail with regard to FIG. 3.

In other implementations, other types of autonomous mobile devices (AMDs) may use the systems and techniques described herein. For example, the AMD 104 may comprise an autonomous ground vehicle that is moving on a street, an autonomous aerial vehicle in the air, autonomous marine vehicle, and so forth.

One or more clocks 202 may provide information indicative of date, time, ticks, and so forth. For example, the processor 140 may use data from the clock 202 to associate a particular time with an action, sensor data 148, and so forth.

The AMD 104 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 254, and so forth. The communication interfaces 204 enable the AMD 104, or components thereof, to communicate with other devices 166 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O devices 208. The I/O devices 208 may include input devices such as one or more of a sensor 152, keyboard, mouse, scanner, and so forth. The I/O devices 208 may also include output devices 244 such as one or more of a motor 142, light, speaker, display, projector, printer, and so forth. In some embodiments, the I/O devices 208 may be physically incorporated with the AMD 104 or may be externally placed.

The network interfaces 254 may be configured to provide communications between the AMD 104 and other devices 166 such as other AMDs 104, the dock 160, routers, access points, and so forth. The network interfaces 254 may include devices configured to couple to personal area networks (PANs), local area networks (LANs), wireless local area networks (WLANS), wide area networks (WANs), and so forth. For example, the network interfaces 254 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 146. The memory 146 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 146 provides storage of computer-readable instructions, data structures, program modules, and other data for the operation of the AMD 104. A few example functional modules are shown stored in the memory 146, although the same functionality may alternatively be implemented in hardware, firmware, or as a system on a chip (SoC).

The memory 146 may include at least one operating system (OS) module 210. The OS module 210 is configured to manage hardware resource devices such as the I/O interfaces 206, the I/O devices 208, the communication interfaces 204, and provide various services to applications or modules executing on the processors 140. The OS module 210 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 146 may be a data store 212 and one or more of the following modules. These modules may be executed as foreground applications, background tasks, daemons, and so forth. The data store 212 may use a flat file, database, linked list, tree, executable code, script, or other data structure to store information. In some implementations, the data store 212 or a portion of the data store 212 may be distributed across one or more other devices 166 including other AMDs 104, servers 164, network attached storage devices, and so forth.

A communication module 214 may be configured to establish communication with other devices 166, such as other AMDs 104, an external server 164, a dock 160, and so forth. The communications may be authenticated, encrypted, and so forth.

Other modules within the memory 146 may include a safety module 130, the mapping module 220, the navigation map module 238, the autonomous navigation module 154, the one or more task modules 242, a speech processing module 218, or other modules 236. The modules may access data stored within the data store 212, including safety tolerance data 260, sensor data 148, other data 234, and so forth.

The safety module 130 may access the safety tolerance data 260 to determine within what tolerances the AMD 104 may operate safely within the physical space 102. For example, the safety module 130 may be configured to stop the AMD 104 from moving when an extensible mast of the AMD 104 is extended. In another example, the safety tolerance data 260 may specify a minimum sound threshold which, when exceeded, stops all movement of the AMD 104. Continuing this example, detection of sound such as a human yell would stop the AMD 104.

The safety module 130 may determine to stop the AMD 104 during movement outside a sensor field-of-view 110 if a portion of the AMD 104 moves outside of the safe region. In the event the safety module 130 determines to stop movement of the AMD 104, the AMD 104 may be stopped by one or more of inhibiting operations of one or more of the motors 142, issuing a command to stop motor operation, disconnecting power from one or more the motors 142, and so forth. The safety module 130 may be implemented as hardware, software, or a combination thereof.

The safety module 130 may control other factors, such as a maximum speed of the AMD 104 based on information obtained by the sensors 152, precision and accuracy of the sensor data 148, and so forth. For example, detection of an object by an optical sensor may include some error, such as when the distance to an object comprises a weighted average between the object and a background. As a result, the maximum speed permitted by the safety module 130 may be based on one or more factors such as the weight of the AMD 104, nature of the floor, distance to the object, and so forth.

The speech processing module 218 may be used to process utterances of the user. Microphones may determine audio in the presence of the AMD 104 and may send raw audio data 262 to an acoustic front end (AFE). The AFE may transform the raw audio data 262 (for example, a single-channel, 16-bit audio stream sampled at 16 kHz), determined by the microphone, into audio feature vectors 224 that may ultimately be used for processing by various components, such as a wakeword detection module 226, speech recognition engine, or other components. The AFE may reduce noise in the raw audio data 262. The AFE may also perform acoustic echo cancellation (AEC) or other operations to account for output audio data that may be sent to a speaker of the AMD 104 for output. For example, the AMD 104 may be playing music or other audio that is being received from a network 162 in the form of output audio data. To avoid the output audio interfering with the device's ability to detect and process input audio, the AFE or other component may perform echo cancellation to remove the output audio data from the input raw audio data 262, or other operations.

The AFE may divide the raw audio data 262 into frames representing time intervals for which the AFE determines a number of values (i.e., features) representing qualities of the raw audio data 262, along with a set of those values (i.e., a feature vector or audio feature vector 224) representing features/qualities of the raw audio data 262 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 262, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 262) may be input into a wakeword detection module 226 that is configured to detect keywords spoken in the audio. The wakeword detection module 226 may use various techniques to determine whether raw audio data 262 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN or using RNN. Following on, posterior threshold tuning, or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 262 or the audio feature vectors 224) to one or more server(s) 164 for speech processing. The audio data 228 corresponding to audio obtained by the microphone may be processed locally on one or more of the processors 140, sent to a server 164 for routing to a recipient device, or may be sent to the server 164 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 238, before sending to the server 164, and so forth.

The speech processing module 218 may include or access an automated speech recognition (ASR) module. The ASR module may accept as input raw audio data 262, audio feature vectors 224, or other sensor data 148 and so forth and may produce as output the input data 246 comprising a text string or other data representation. The input data 246 comprising the text string or other data representation may be processed by the navigation map module 238 to determine the command to be executed. For example, the utterance of the command "robot, come here" may result in input data 246 comprising the text string "come here". The wakeword "robot" may be omitted from the input data 246.

An autonomous navigation module 154 provides the AMD 104 with the ability to navigate within the physical space 102 without real-time human interaction. The autonomous navigation module 154 may implement, or operate in conjunction with, the mapping module 220 to determine one or more of an occupancy map, a navigation map 248, or other representations of the physical space 102. The AMD 104 may move through the physical space 102. The motion of the AMD 104 may be described as a trajectory. In some implementations the trajectory may include a set of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes.

The mapping module 220 may use one or more simultaneous localization and mapping ("SLAM") techniques. The SLAM algorithms may utilize one or more of maps, algorithms, beacons, or other techniques to navigate. The autonomous navigation module 154 may use the navigation map 248 to determine a set of possible paths along which the AMD 104 may move. One of these may be selected and used to determine path plan data 232 indicative of a path. For example, a possible path that is the shortest or has the fewest turns may be selected and used to determine the path. The path is then subsequently used to determine a set of commands that drive the motors 142 connected to the wheels. For example, the autonomous navigation module 154 may determine the current location within the physical space 102 and determine path plan data 232 that describes the path to a destination location.

The AMD 104 may use the autonomous navigation module 154 to navigate to a docking area that includes the dock 160. For example, if the AMD 104 determines to recharge one or more batteries 144, then the AMD 104 may use path plan data 232 to navigate to a destination location that is in front of the dock 160. The autonomous navigation module 154 may utilize various techniques during processing of sensor data 148. For example, image data obtained from cameras on the AMD 104 may be processed to determine one or more of corners, edges, planes, and so forth. In some implementations, corners may be detected, and the coordinates of those corners may be used to produce point cloud data. This point cloud data may then be used for SLAM or other purposes associated with mapping, navigation, and so forth.

The AMD 104 may move responsive to a determination made by an onboard processor 140, in response to a command received from one or more communication interfaces 204, as determined from the sensor data 148, and so forth. For example, an external server 164 may send a command that is received using the network interface 254. This command may direct the AMD 104 to proceed to find a particular user, follow a particular user, and so forth. The AMD 104 may then process this command and use the autonomous navigation module 154 to determine the directions and distances associated with carrying out the command. For example, the command to "come here" may result in the task module 242 sending a command to the autonomous navigation module 154 to move the AMD 104 to a particular location near the user and orient the AMD 104 in a particular direction.

The AMD 104 may connect to the network 162 using one or more of the network interfaces 254. In some implementations, one or more of the modules or other functions described here may execute on the processors 140 of the AMD 104, on the server 164, or a combination thereof. For example, one or more servers 164 may provide various functions, such as ASR, natural language understanding (NLU), providing content such as audio or video to the AMD 104, and so forth.

The other modules 236 may provide other functionality, such as object recognition, speech synthesis, user identification, and so forth. The other modules 236 may comprise a speech synthesis module that is able to convert text data to human speech. For example, the speech synthesis module may be used by the AMD 104 to provide speech that a user is able to understand.

The data store 212 may store the other data 234 as well. For example, localization settings may indicate local preferences such as language, user identifier data may be stored that allows for identification of a particular user, and so forth. The data store 212 may also store values for various thresholds such as threshold data 252.

Figure 3:
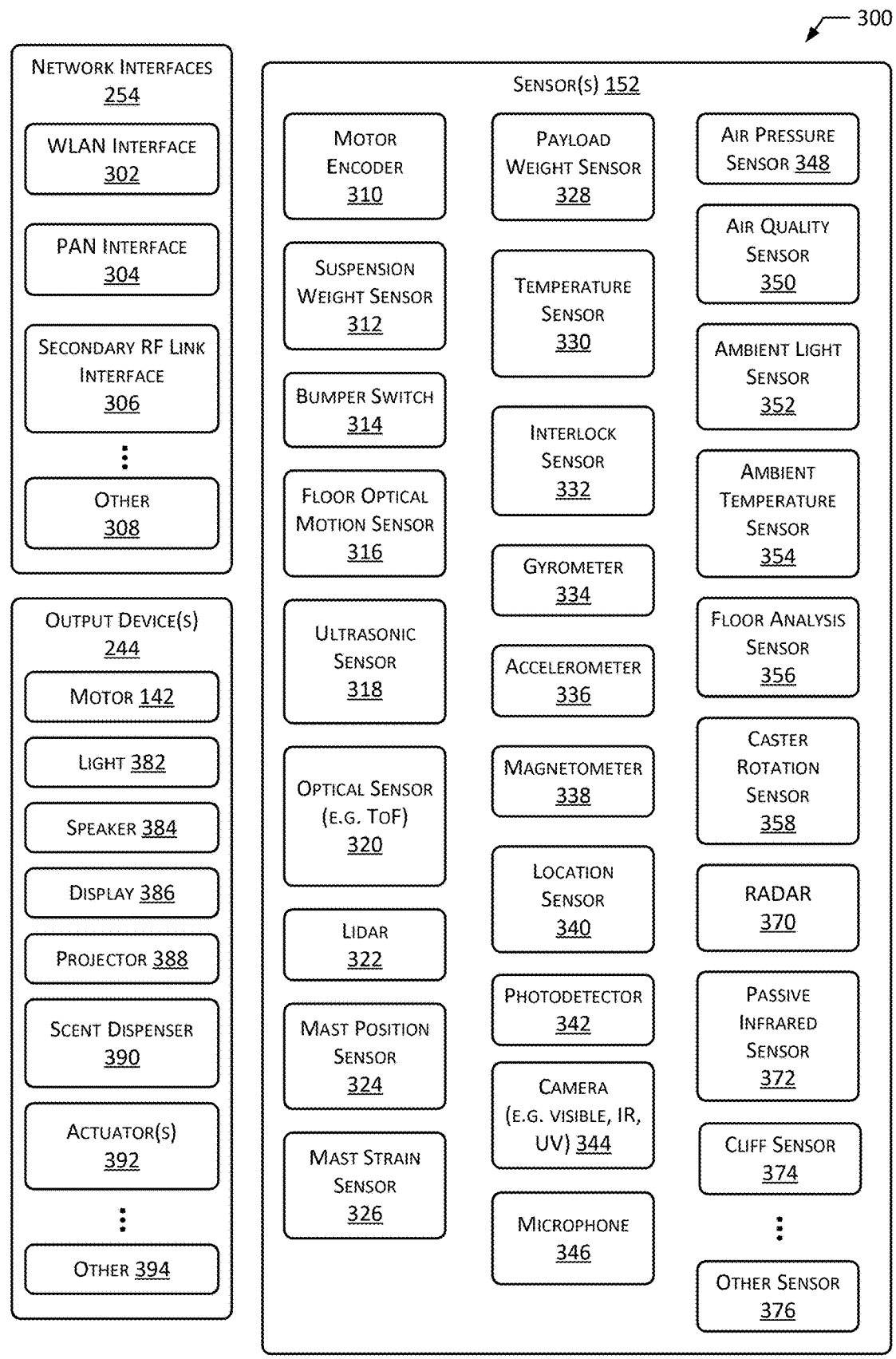
FIG. 3 is a block diagram of additional components of the AMD, according to some implementations.

FIG. 3 is a block diagram 300 of additional components of the AMD 104, according to some implementations.

The components illustrated here are provided by way of illustration and not necessarily as a limitation. For example, the AMD 104 may utilize a subset of the particular network interfaces 254, output devices 244, or sensors 152 depicted here, or may utilize components not pictured. One or more of the sensors 152, output devices 244, or a combination thereof may be included on a moveable component that may be panned, tilted, rotated, or any combination thereof with respect to a chassis of the AMD 104.

The network interfaces 254 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHZ ISM band, within a licensed band at another frequency, and so forth. The secondary RF link interface 306 may be utilized to provide backup communication between the AMD 104 and other devices 166 in the event that communication fails using one or more of the WLAN interface 302 or the PAN interface 304. For example, in the event the AMD 104 travels to a geographical area within the physical space 102 that does not have Wi-Fi coverage, the AMD 104 may use the secondary RF link interface 306 to communicate with another device such as a specialized access point, dock 160, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 152. The sensors 152 depicted here are provided by way of illustration and not necessarily as a limitation. It is understood that other sensors 152 may be included or utilized by the AMD 104, while some sensors 152 may be omitted in some configurations.

A motor encoder 310 provides information indicative of the rotation or linear extension of a motor 142. The motor 142 may comprise a rotary motor, or a linear actuator. In some implementations, the motor encoder 310 may comprise a separate assembly such as a photodiode and encoder wheel that is affixed to the motor 142. In other implementations, the motor encoder 310 may comprise circuitry configured to drive the motor 142. For example, the autonomous navigation module 154 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 130 may use data from the suspension weight sensor 312 to determine whether or not to inhibit operation of one or more of the motors 142. For example, if the suspension weight sensor 312 indicates no weight on the suspension, the implication is that the AMD 104 is no longer resting on its wheels, and thus operation of the motors 142 may be inhibited. In another example, if the suspension weight sensor 312 indicates weight that exceeds a threshold value, the implication is that something heavy is resting on the AMD 104 and thus operation of the motors 142 may be inhibited. For example, the threshold value may comprise a weight of a load that compresses a suspension system to a minimum height, or results in a mass that exceeds a torque output of the motors 142 to maintain a minimum acceleration.

One or more bumper switches 314 provide an indication of physical contact between a bumper or other member that is in mechanical contact with the bumper switch 314. The safety module 130 utilizes sensor data 148 obtained by the bumper switches 314 to modify the operation of the AMD 104. For example, if the bumper switch 314 associated with a front of the AMD 104 is triggered, the safety module 130 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 152 to an object. The one or more active sensors may comprise the ultrasonic sensor 318. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field-of-view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 148 indicative of one or more of a presence or absence of an object, a distance to the object, or characteristics of the object. The one or more active sensors may comprise one or more optical sensors 320. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4×4 array of light sensing elements. Each individual sensing element may be associated with a field-of-view (FOV) that is directed in a different way. For example, the optical sensor 320 may have four light sensing elements, each associated with a different 10° FOV, allowing the sensor to have an overall FOV of 40°.

In another implementation, a structured light pattern may be provided by the optical emitter. The one or more active sensors may comprise the optical emitter. A portion of the structured light pattern may then be detected on the object using a sensor 152 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 130 and the autonomous navigation module 154 may utilize the sensor data 148 indicative of the distance to an object in order to prevent a collision with that object.

Multiple optical sensors 320 may be operated such that their FOV overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A LIDAR 322 sensor provides information indicative of a distance to an object or portion thereof by utilizing laser light. The one or more active sensors may comprise the LIDAR 322 The laser is scanned across a scene at various points, emitting pulses which may be reflected by objects within the scene. Based on the time-of-flight distance to that particular point, sensor data 148 may be generated that is indicative of the presence of objects and the relative positions, shapes, and so forth that are visible to the lidar 322. Data from the lidar 322 may be used by various modules. For example, the autonomous navigation module 154 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 130. For example, if the AMD 104 is preparing to move, data from the mast position sensor 324 may be checked to determine if the mast is retracted, and if not, the mast may be retracted before to beginning movement.

A mast strain sensor 326 provides information indicative of a strain on the mast with respect to the remainder of the AMD 104. For example, the mast strain sensor 326 may comprise a strain gauge or load cell that measures a sideload applied to the mast or a weight on the mast or downward pressure on the mast. The safety module 130 may utilize sensor data 148 obtained by the mast strain sensor 326. For example, if the strain applied to the mast exceeds a threshold amount, the safety module 130 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 130 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 144, one or more motors 142, and so forth. In the event the temperature exceeds a threshold value, the component associated with that device temperature sensor 330 may be shut down. For example, the threshold value may be determined based on component specifications, such as a maximum permissible temperature of the batteries 144.

One or more interlock sensors 332 may provide data to the safety module 130 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 148 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 148 indicative of impinging light. For example, the photodetector 342 may provide data indicative of a color, intensity, duration, and so forth.

A camera 344 generates sensor data 148 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data determined by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 148 comprising images being sent to the autonomous navigation module 154. In another example, the camera 344 may comprise a 10 megapixel or greater camera that is used for videoconferencing or for acquiring pictures for the user. The one or more passive sensors may comprise one or more cameras 344.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 154 may be determined using a rolling shutter and subsequently may be processed to mitigate image artifacts.

One or more microphones 346 may be configured to determine information indicative of sound present in the physical space 102. In some implementations, arrays of microphones 346 may be used. These arrays may implement beamforming techniques to provide for directionality of gain. The AMD 104 may use the one or more microphones 346 to determine information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 130, the autonomous navigation module 154, the task module 242, and so forth. For example, if the floor analysis sensor 356 determines that the floor is wet, the safety module 130 may decrease the speed of the AMD 104 and generate a notification alerting the user.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 152 may include a radar 370. The one or more active sensors may comprise radar 370. The radar 370 may be used to provide information as to a distance, lateral position, and so forth, to an object.

The sensors 152 may include a passive infrared (PIR) sensor 372. The PIR 372 sensor may be used to detect the presence of users, pets, hotspots, and so forth. For example, the PIR sensor 372 may be configured to detect infrared radiation with wavelengths between 8 and 14 micrometers.

A cliff sensor 374 may comprise an optical sensor 320. The AMD 104 may have one or more cliff sensors 374 located on a front portion of the AMD 104. For example, the cliff sensors 374 may be time-of-flight sensors that have a field-of-view directed downward toward a floor over which the AMD 104 is moving.

The AMD 104 may include other sensors 376 as well. For example, a capacitive proximity sensor may be used to provide proximity data to adjacent objects. Other sensors 376 may include radio frequency identification (RFID) readers, near field communication (NFC) systems, coded aperture cameras, and so forth. For example, NFC tags may be placed at various points within the physical space 102 to provide landmarks for the autonomous navigation module 154. One or more touch sensors may be utilized to determine contact with a user or other objects.

The AMD 104 may include one or more output devices 244. A motor 142 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. An actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user. Continuing the example, a motor 142 with an eccentric weight may be used to create a buzz or vibration to allow the AMD 104 to simulate the purr of a cat.

Figure 4:
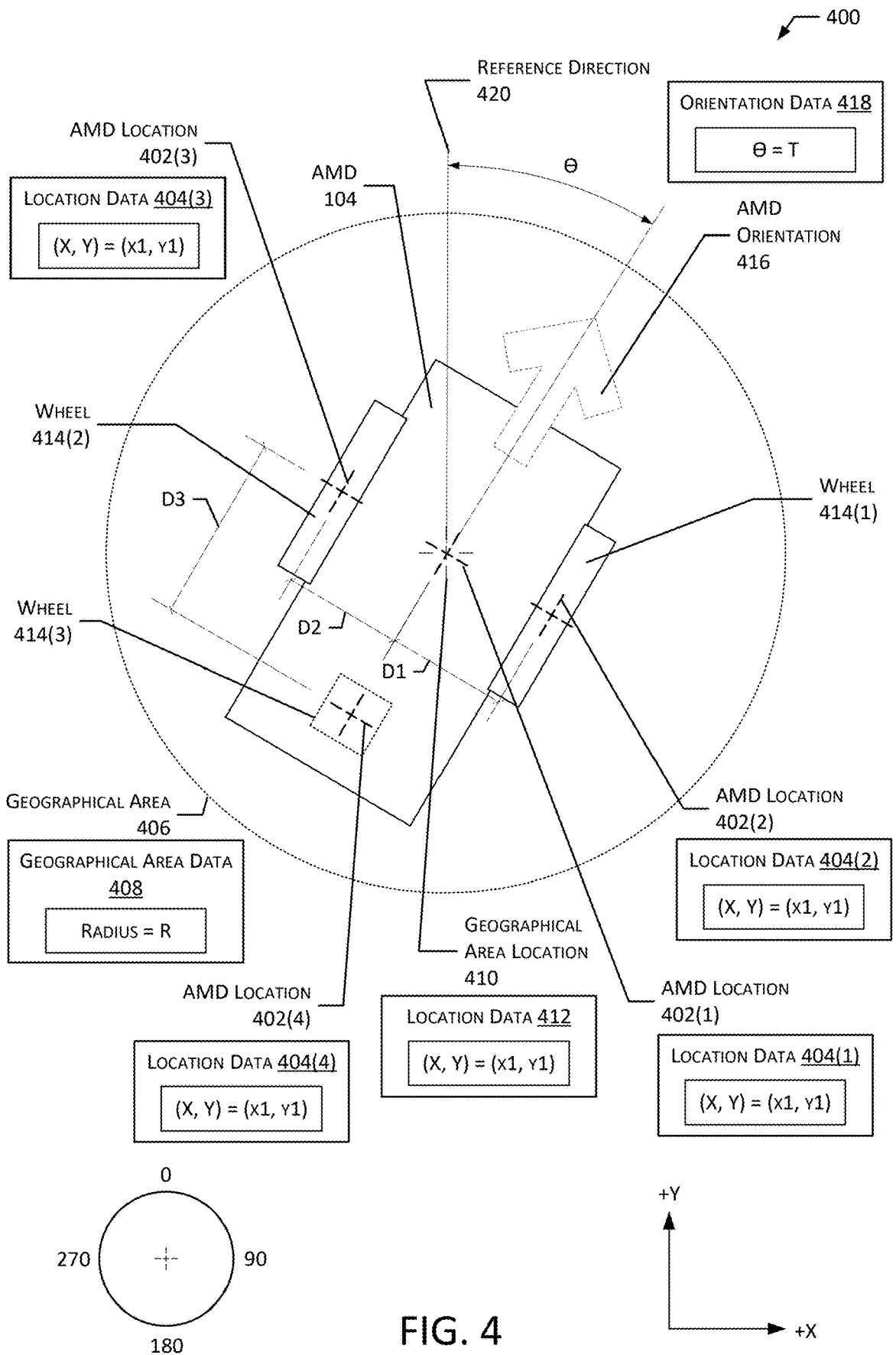
FIG. 4 illustrates the AMD relative to a safe region, according to some implementations.

FIG. 4 illustrates, at 400, the AMD 104 relative to a safe region, according to some implementations.

In this example, the safety module 130 determines whether or not a portion of the AMD 104 is outside of a first geographical area 406 belonging to the safe region 190 based on pose data for the AMD and on a geographical area location 410 of the first geographical area 406. Each geographical area of the safe region 190 may be representative of a geographical area of the physical space 102. A geographical area may be any given portion or aggregation of portions of the physical space 102. A geographical area may be indicated by one or more cells of an occupancy map. First geographical area data 408 is indicative of the first geographical area 406, where the first geographical area 406 is a circular area and the first geographical area data 408 is indicative of a radius specifying a size of the first geographical area 406. In this example, the AMD 104 is located at AMD location 402(1). The AMD location 402(1) may be an axle center. For example, the AMD location 402(1) may be determined relative to AMD locations 402(2)-(4). AMD locations 402(2)-(4) are associated with wheel 414(1)-(3) locations, respectively. The AMD locations 402(1) may be indicated by location data 404(1), AMD location 402(2) may be indicated by location data 404(2), AMD location 402(3) may be indicated by location data 404(3), and AMD location 402(4) may be indicated by location data 404(4). The location of an AMD 104 may not be at any single point of the physical space 102. The AMD 104 may occupy a geographical area of physical space 102 that is a perimeter of the AMD 104 on an X-Y plane of the physical space 102. In this example, for simplicity and for ease of explanation, the location of the AMD 104 is represented by locations 402(1)-(4). A first location 402(1) may be determined based on an intersection of a perpendicular line that extends from a line between a second AMD location 402(2) to a third AMD location 402(3) toward the fourth AMD location 402(4).

In some implementations, one or more locations determined based on one or more portions of the AMD 104 are used to determine whether or not a portion of the AMD 104 is outside of the safe region 190. The one or more locations determined based on the one or more portions of the AMD 104 may be arbitrary locations associated with the structure. For example, to determine whether a portion of the AMD 104 is outside of the safe region 190, the safety module 130 may use a location for the portion that may be associated with one or more of: an area along a perimeter of the structure, an attachment to the structure, a location at a specified distance from the structure, or a perimeter of the chassis.

The second AMD location 402(2) may be associated with a first wheel 414(1), the third AMD location 402(3) may be associated with a second wheel 414(2), and the fourth AMD location 402(4) may be associated with a third wheel 414(3). The AMD 104 may be determined to be outside of the first geographical area 406 based on any of the AMD locations 402(1)-(4) being located outside of a perimeter of the first geographical area 406.

The first AMD location 402(1) may be determined using localization data. For example, localization data may be determined using sensor data 148 with respect to one or more external references, such as physical objects within the physical space 102. For example, sensor data 148 may be used to determine pose data for the AMD 104 based on one or more distances to one or more reference objects in the physical space 102. The pose data may indicate the first AMD location 402(1) and orientation data 418 may indicate the AMD orientation 416. AMD orientation 416 may be oriented with respect to a reference direction 420. The reference direction 420 may be defined with respect to an origin in the physical space 102, such as a docking station or dock 160. The reference direction 420 may also be defined using a magnetometer 338 by measuring a terrestrial magnetic field indicative of a magnetic heading, such as north, south, east, or west. In this example, the first AMD location 402(1) indicates first coordinates of $(x_1, y_1)$, and an orientation of 0 of T degrees.

Given the first location 402(1), and the first coordinates, $(x_1, y_1)$ and orientation 0, the following equations may be used to determine second coordinates, $(x_2, y_2)$, for the second AMD location 402(2), third coordinates, $(x_3, y_3)$, for the third AMD location 402(3), and fourth coordinates, $(x_4, y_4)$, for the fourth AMD location 402(4):

$$(x_2, y_2) = (x_1 + D_1 \times \cos\theta, y_1 - D_1 \times \sin\theta), \quad \text{(Equation 2)}$$

$$(x_3, y_3) = (x_1 - D_2 \times \cos\theta, y_1 + D_2 \times \sin\theta), \text{ and} \quad \text{(Equation 3)}$$

$$(x_4, y_4) = (x_1 - D_3 \times \sin\theta, y_1 - D_3 \times \cos\theta). \quad \text{(Equation 4)}$$

In this example, $D_1$ is a distance between the AMD location associated with an axle center, 402(1), and the second AMD location 402(2) associated the first wheel 414(1). In this example, $D_2$ is a distance between the AMD location associated with the axle center, 402(1), and the third AMD location 402(3) associated the second wheel 414(2). In this example, $D_3$ is a distance between the AMD location associated with the axle center, 402(1), and the fourth AMD location 402(4) associated the third wheel 414(3).

Continuing with this example, a first distance between the second location AMD location 402(2) and the geographical area location 410 may be determined. The first distance may be determined using the Pythagorean theorem as described above with respect to Equation 1 to determine a distance between two coordinates on an X-Y plane. Similarly, a second distance may be determined between the third AMD location 402(3) and the geographical area location 410, and a third distance may be determined between the fourth AMD location 402(4) and the geographical area location 410. The perimeter of the geographical area 406 is represented by a radius of the circular area, geographical area 406. For example, to determine to stop the AMD 104 the safety module 130 may, for a given location occupied by a given portion of the AMD 104, determine that each location of each geographical area of a safe region 190 is located at least a distance from the given location that is greater than a distance associated with the radius.

Given that the radius R of the geographical area 406 may be used to determine a perimeter of the geographical area 406, and coordinates for each of the second AMD location, 402(2), third AMD location 402(3), and fourth AMD location 402(4), the safety module 130 may determine whether any of the AMD locations is outside of the perimeter of the geographical area 406. For example, if the first distance associated with the second AMD location 402(2) is greater than R, then the portion of the AMD 104 associated with the second AMD location 402(2) is outside of the geographical area 406.

Similarly, if the second distance associated with the third AMD location 402(3) is greater than R, then the portion of the AMD 104 associated with the third AMD location 402(3) is outside of the geographical area 406. Similarly, if the third distance associated with the fourth AMD location 402(4) is greater than R, then the portion of the AMD 104 associated with the fourth AMD location 402(4) is outside of the geographical area 406. In this example, the distance between the first AMD location 402(1) and the geographical area location 410 may be unnecessary because if any of the second AMD location 402(2), third AMD location 402(3), or fourth AMD location 402(4) are outside of the geographical area 406, then the first AMD location 402(1) may be outside of the geographical area 406.

In some implementations, as the AMD 104 moves in a direction outside the sensor FOV 110, a similar determination may be performed for each geographical area of the safe region 190. If any of the AMD locations 402(1)-(4) are determined to be outside of any geographical areas of the safe region 190, then the AMD 104 may be determined to be outside of the safe region 190, and the safety module 130 may stop movement of the AMD 104. In some examples, the safety module 130 may determine whether a portion of the AMD 104 is outside of the safe region 190 after each X centimeters traveled in a direction outside the sensor FOV 110. In some examples, X may be 1 cm, but may be greater or less than 1 cm in other examples.

In some implementations, a speed of the AMD 104 may be used to dynamically determine locations relative to the AMD 104 that are used to determine whether the AMD 104 is outside of the safe region 190. A first speed may be determined by motor encoder data indicating an amount of rotation of each wheel 414 of the AMD 104. The amount of rotation over a period of time, given a wheel radius, may be used to determine the speed of the AMD 104. A second speed may be determined based on a planned speed for movement of the AMD 104. For example, the autonomous navigation module 164, in addition to determining a path for the AMD 104, may also determine a speed at which to move the AMD 104 along the path. In the following example, either the first speed or the second speed may be used to determine locations relative to the AMD 104 that are used to determine whether the AMD 104 is outside the safe region 190.

As one example, the AMD 104 may be moving at 1.0 meters per second (m/s), and the AMD 104 moving at 1.0 m/s takes 6 centimeters (cm) to come to a complete stop. Based on a stopping distance of 6 cm, the AMD 104 may determine AMD locations 402(2)-(4), each associated with a wheel of the AMD 104, to be located at a distance from AMD location 402(1) that is a sum of the distance from the axle center plus the stopping distance. As described above, AMD location 402(1) is at the axle center. In this example, in the above calculations, AMD location 402(2) would be a distance from the axle center of $(D_1+B)$, AMD location 402(3) would be a distance from the axle center of $(D_2+B)$, and AMD location 402(4) would be a distance from the axle center of $(D_3+B)$, where B is a distance to come to a complete stop given a moving speed of S m/s. In this example, as the moving speed, S, increases, the stopping distance, B, may also increase and the distance from the axle center, (D+B), also increases for each of $D_1$, $D_2$, and $D_3$. Similarly, as the moving speed, S, decreases, the stopping distance, B, decreases, and the distance from the axle center, (D+B), also decreases for each of $D_1$, $D_2$, and $D_3$.

In some implementations, a size of a geographical area of the safe region 190 may be based on a footprint of a structure of the AMD 104 and a stopping distance. As described above, a structure of the AMD 104 may include the chassis, wheels, and one or more extensions or attachments. A footprint may be associated with a geographical area occupied by the structure of the AMD 104. In this implementation, a given geographical area of the safe region 190 may be circular. A first radius may be associated with a circular area that encompasses the footprint of the structure of the AMD 104. In this example, the stopping distance may be specified to be a constant value, such as 10 cm, which may be a maximum stopping distance for the AMD 104. In other examples, the stopping distance may be specified to be more or less than 10 cm. The safety module 130 may determine a second radius that is indicative of the first radius minus the stopping distance. Given the second radius, the safety module 130 may specify each geographical area to be circular, with a radius specified by the second radius.

In some implementations, a size of a geographical area of the safe region 190 may be based on a speed of the AMD 104. Similar to the above example that based a size of a geographical area on a stopping distance, in this example a size of the geographical area is based on a current speed of the AMD 104. However, in contrast to the above example, where a constant stopping distance is used, in this example, a stopping distance is determined dynamically. If the AMD 104 is moving slowly, then the stopping distance may be smaller than a stopping distance for the AMD 104 when it is moving faster. For example, the safety module 130 may determine a first speed associated with movement of the AMD 104 in a direction that is outside a field-of-view of the one or more sensors 152. Based on the first speed, the AMD 104 may determine a first stopping distance.

Continuing this example, a footprint may be associated with a geographical area occupied by the structure of the AMD 104. In this implementation, a given geographical area of the safe region 190 may be circular. A first radius may be associated with a circular area that encompasses the footprint of the structure of the AMD 104. In this example, the stopping distance may be specified to be the first stopping distance, where the first stopping distance is based on the first speed. The safety module 130 may determine a second radius that is indicative of the first radius minus the first stopping distance. Given the second radius, the safety module 130 may specify each geographical area to be circular, with a radius specified by the second radius.

In some implementations, the AMD 104 may dynamically adjust a size of a footprint used by the safety module 130 in determining whether the AMD 104 is outside the safe region

190. For example, the AMD 104 may have a first footprint that is associated with a geographical area occupied by the structure of the AMD 104. A first stopping distance may be determined to be a maximum stopping distance. A second stopping distance may be determined based on a speed of the AMD 104. Determining a stopping distance based on speed is describe with respect to FIG. 1. In this example, a stopping distance may be the first stopping distance or the second stopping distance. A second footprint may be determined based on extending one or more locations along a perimeter of the first footprint by the stopping distance. In this implementation, by using the second footprint to determine whether the AMD 104 is within the safe region 190, the safety module 130 may stop the AMD 104 from moving outside the safe region 190 because the AMD 104 may have enough distance in which to stop before moving outside the safe region 190.

In some of the above implementations, the AMD 104 determines to move in a direction that is outside a field-of-view of the one or more sensors 152 and then stops if the safety module 130 determines that a portion of the AMD 104 is outside of the safe region 190. In some implementations, as a logical equivalence to such an implementation, the AMD 104 may determine to move in a direction that is outside of a field-of-view of the one or more sensors 152 and the AMD 104 is not permitted to stop until a portion of the AMD 104 is outside of the safe region 190.

Figure 5:
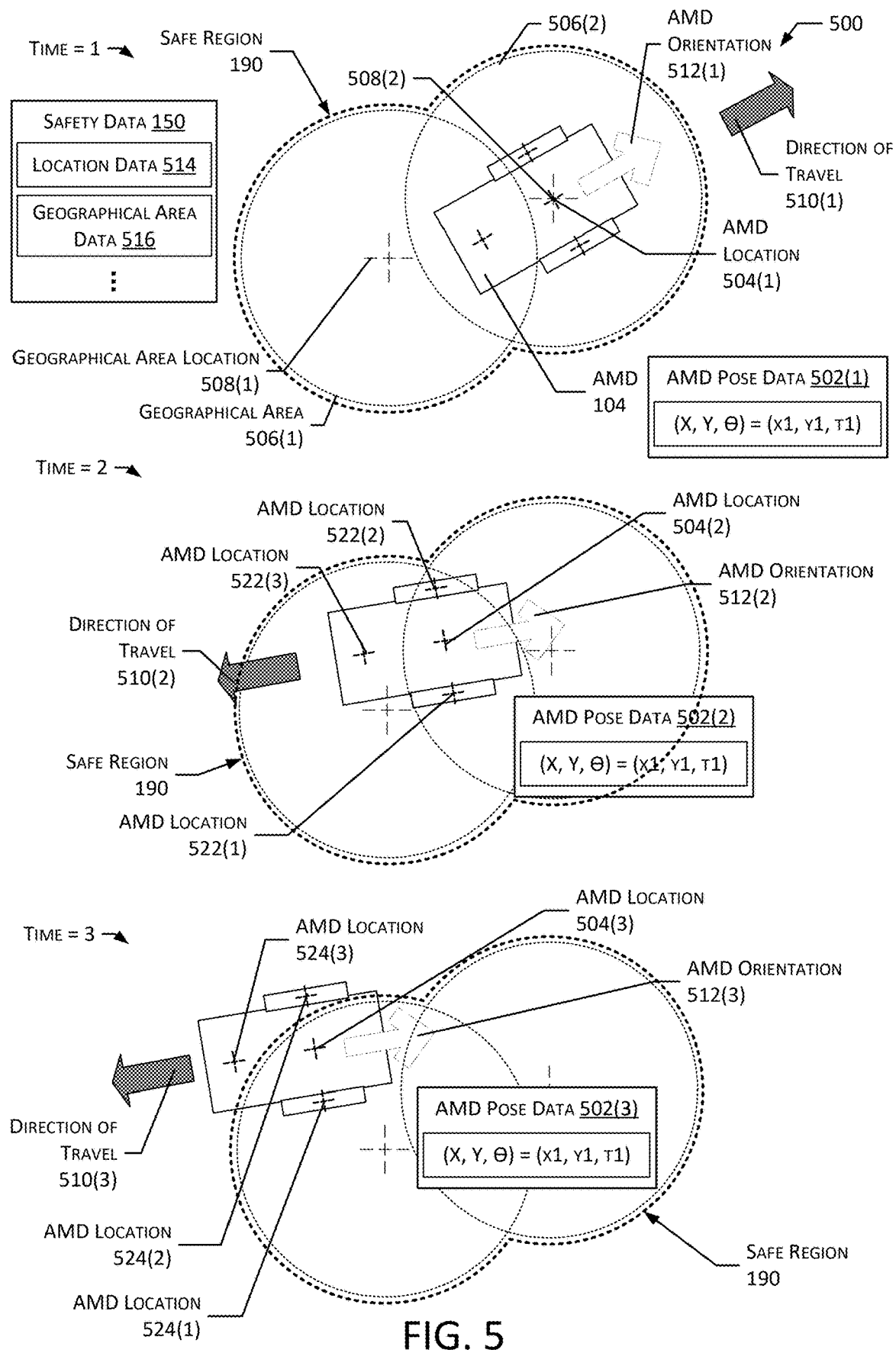
FIG. 5 illustrates the AMD using a safe region for safe movement outside a sensor field-of-view, according to some implementations.

FIG. 5 illustrates, at 500, the AMD 104 using a safe region for safe movement outside a sensor field-of-view 110, according to some implementations.

In this example, the AMD 104 uses a safe region to safely navigate in a direction that is outside of the field-of-view of one or more sensors 152. The AMD 104 may be moving within a geographical area, such as the physical space 102. The AMD 104 may have one or more sensors 154 with a sensor field-of-view 110 that includes a first direction of travel 510(1). The AMD 104 may determine pose data at different times. For example, the AMD 104 may determine pose data based on localization data, as described above. As another example, the AMD 104 may determine pose data relative to a previous location, such as a location for a most recent geographical area of the safe region. The safety data 150 may include location data and geographical area data for each of the geographical areas of the safe region, including location data 514 and geographical area data 516.

At a first time, time=1, the AMD 104 travels forward with the use of sensor data 148 and an occupancy map. As the AMD 104 travels forward, a safe region is determined to be clear of obstacles that may obstruct travel. In this example, the safe region includes two geographical areas, geographical areas 506(1)-(2). In other examples, the safe region may include more of fewer geographical areas. Geographical area 506(1) is located at geographical area location 508(1), and geographical area 506(1) is circular and indicated by a first radius value. Geographical area 506(2) is located at geographical area location 508(2), and geographical area 506(2) is circular and indicated by a second radius value. In some examples, the first radius value may be equal to the second radius value. In other examples, a radius value may depend on sensor data 148 determined while the AMD 104 was traveling through a given geographical area. For example, while traveling through the given geographical area, if the sensor data 148 from multiple sensors 152 is consistent, then a radius value for the given geographical area may be increased based on a field-of-view of the one or more sensors 152.

Further at the first time, the AMD 104 may be moving in a first direction of travel 510(1). The AMD 104 may have a first AMD orientation 512(1) and a first AMD location 504(1). The AMD pose data 502(1) may be indicative of the first AMD location 504(1) and the first AMD orientation 512(1). As discussed above, AMD pose data 502 may be relative to a previous location or may be relative to an origin. A distance and orientation relative to a previous location may be based on motor encoder data. The motor encoder data may indicate an amount of rotation of each wheel 414 of the AMD 104, where the amount of rotation, given a wheel radius, may be used to determine a distance traveled. An orientation relative to a previous location may be determined based on a difference between a first rotation of a first wheel 414(1) and a second rotation of a second wheel 414(2). Pose data relative to an origin may be based on localization data relative to the origin, such as a dock 160, or such as a fixed object within the physical space 102.

Before the second time, time=2, the AMD 104 may have determined an instruction and may have begun to move in a direction that is outside the sensor FOV 110. At the second time, the AMD 104 may use the safe region to determine whether the AMD 104 is within an aggregate area comprising each geographical area of the safe region. To determine whether one or more portions of the AMD 104 have moved outside of any of the geographical areas of the safe region, the safety module 130 may determine whether portions of the AMD 104 associated with one or more AMD locations 522 are within the safe region. To determine whether any of the first AMD location 522(1), second AMD location 522(2), or third AMD location 522(3) are outside of both the first geographical area 506(1) and the second geographical area 506(2), the safety module 130 determines two sets of distance values.

A first set of distance values may include distances between AMD locations 522(1)-(3) and the first geographical area location 508(1). A second set of distance values may include distances between AMD locations 522(1)-(3) and the second geographical area location 508(2). If any of the distance values in the first set of distance values is greater than a first radius associated with the first geographical area 506(1) and also greater than a second radius associated with the second geographical area 506(2), then at least a portion of the AMD 104 is determined to be outside of the safe region. Similarly, if any of the distance values in the second set of distance values is greater than a first radius associated with the first geographical area 506(1) and also greater than a second radius associated with the second geographical area 506(2), then at least a portion of the AMD 104 is determined to be outside of the safe region.

A first set of distance values may include three distances, a first distance between the first AMD location 522(1) and the first geographical area location 508(1), a second distance between the second AMD location 522(2) and the first geographical area location 508(1), and a third distance between the third AMD location 522(3) and the first geographical area location 508(1). The second set of distance values may include three distances, a fourth distance between the first AMD location 522(1) and the second geographical area location 508(2), a fifth distance between the second AMD location 522(2) and the second geographical area location 508(2), and a sixth distance between the third AMD location 522(3) and the second geographical area location 508(2).

The first set of distance values may be determined by determining distances between coordinates for the AMD locations 522(1)-(3) and the first geographical area location 508(1). The second AMD pose data 502(2) may indicate the second AMD location 504(2) of $(x_1,y_1)$ and a second AMD orientation 512(2) of $\theta$. Given the first coordinates, $(x_1,y_1)$ and the second AMD orientation 512(2) of $\theta$, the following equations may be used to determine second coordinates, $(x_2,y_2)$, for the first AMD location 522(1), third coordinates, $(x_3,y_3)$, for the second AMD location 522(2), and fourth coordinates, $(x_4,y_4)$, for the third AMD location 522(3):

$$(x_2,y_2)=(x_1+D_1 \times \cos\theta, y_1-D_1 \times \sin\theta), \quad \text{(Equation 5)}$$

$$(x_3,y_3)=(x_1-D_2 \times \cos\theta, y_1+D_2 \times \sin\theta), \text{ and} \quad \text{(Equation 6)}$$

$$(x_4,y_4)=(x_1-D_3 \times \sin\theta, y_1-D_3 \times \cos\theta). \quad \text{(Equation 7)}$$

In this example, $D_1$ is a distance between the AMD location 504(2) and the first AMD location 522(1), $D_2$ is a distance between the AMD location 504(2) and the second AMD location 522(2), and $D_3$ is a distance between the AMD location 504(2) and the third AMD location 522(3). $D_1$, $D_2$, and $D_3$ may be constant values, where $D_1$ is a difference between an axle center on the AMD 104 and a first wheel 414(1), $D_2$ is a difference between the axle center on the AMD 104 and a second wheel 414(2), and $D_3$ is a difference between the axle center on the AMD 104 and the third wheel 414(3).

Given determined coordinates for each of the AMD locations 522(1)-(3), the first set of distance values may be determined as differences between each of the coordinates for the AMD locations 522(1)-(3) and the first geographical area location 508(1). If any of the first set of distance values is greater than the first radius, then at least one portion of the AMD 104 may be outside of the first geographical area 506(1) because the first geographical area 506(1) is circular and has an area specified by a first radius. The first geographical area location 508(1) may be indicated by fifth coordinates, $(x_5,y_5)$. A first distance value, $d_1$, between the first geographical area location 508(1) and the first AMD location 522(1), a second distance value, $d_2$, between the first geographical area location 508(1) and the second AMD location 522(2), a third distance value, $d_3$, between the first geographical area location 508(1) and the third AMD location 522(3), may be determined using the following equations:

$$d_1=\sqrt{(x_5-x_2)^2+(y_5-y_2)^2}, \quad \text{(Equation 8)}$$

$$d_2=\sqrt{(x_5-x_3)^2+(y_5-y_3)^2}, \text{ and} \quad \text{(Equation 9)}$$

$$d_3=\sqrt{(x_5-x_4)^2+(y_5-y_4)^2}. \quad \text{(Equation 10)}$$

In this example, if any of $d_1$, $d_2$, or $d_3$ is greater than the first radius, then at least a portion of the AMD 104 associated with either $d_1$, $d_2$, or $d_3$ is outside of the first geographical area 506(1).

The second set of distance values may be determined similarly to the first set of distance values, resulting in the second set of distance values including $d_4$, $d_5$, and $d_6$. In this example, $d_4$ is a distance between the second geographical area location 508(2) and the first AMD location 522(1), $d_5$ is a distance between the second geographical area location 508(2) and the second AMD location 522(2), and $d_6$ is a distance between the second geographical area location 508(2) and the third AMD location 522(3). In this example, if any of $d_4$, $d_5$, or $d_6$ is greater than the second radius, then at least a portion of the AMD 104 associated with either $d_4$, $d_5$, or $d_6$ is outside of the second geographical area 506(2).

Continuing this example, based on the first set of distance values and the second set of distance values, if any of the AMD locations 522 are outside of both the first geographical area 506(1) and the second geographical area 506(2), then at least one portion of the AMD 104 is outside of each geographical area of the safe region. In this example, none of the AMD locations 522(1)-(3) are outside of both the first geographical area 506(1) and the second geographical area 506(2), so the AMD 104 may continue moving in the second direction of travel 510(2) that is outside the sensor FOV 110.

At the third time, time=3, the AMD 104 may determine that a portion of the AMD 104 has moved outside of at least one of the geographical areas of the safe region, and the safety module 130 stops movement of the AMD 104. At the third time, the safety module 130 may determine a third set of distances and a fourth set of distances.

The third set of distance values may include distances between AMD locations 524(1)-(3) and the first geographical area location 508(1). The second set of distance values may include distances between AMD locations 524(1)-(3) and the second geographical area location 508(2). If any of the distance values in the third set of distance values is greater than a first radius associated with the first geographical area 506(1) and also greater than a second radius associated with the second geographical area 506(2), then at least a portion of the AMD 104 is determined to be outside of the safe region. Similarly, if any of the distance values in the fourth set of distance values is greater than a first radius associated with the first geographical area 506(1) and also greater than a second radius associated with the second geographical area 506(2), then at least a portion of the AMD 104 is determined to be outside of the safe region.

The third set of distance values may be determined by determining distances between coordinates for the AMD locations 524(1)-(3) and the first geographical area location 508(1). The third AMD pose data 502(3) may indicate the third AMD location 504(3) of $(x_6,y_6)$ and a third AMD orientation 512(3) of $\theta$. Given the sixth coordinates, $(x_6,y_6)$ and the third AMD orientation 512(3) of $\theta$, the following equations may be used to determine seventh coordinates, $(x_7,y_7)$, for the first AMD location 524(1), eighth coordinates, $(x_8,y_8)$, for the second AMD location 524(2), and ninth coordinates, $(x_9,y_9)$, for the third AMD location 524(3):

$$(x_7,y_7)=(x_6+D_1 \times \cos\theta, y_6-D_1 \times \sin\theta), \quad \text{(Equation 11)}$$

$$(x_8,y_8)=(x_6-D_2 \times \cos\theta, y_6+D_2 \times \sin\theta), \text{ and} \quad \text{(Equation 12)}$$

$$(x_9,y_9)=(x_6-D_3 \times \sin\theta, y_6-D_3 \times \cos\theta). \quad \text{(Equation 13)}$$

In this example, $D_1$ is a distance between the AMD location 504(3) and the first AMD location 524(1), $D_2$ is a distance between the AMD location 504(3) and the second AMD location 524(2), and $D_3$ is a distance between the AMD location 504(3) and the third AMD location 524(3). $D_1$, $D_2$, and $D_3$ may be constant values, where the $D_1$ is a difference between an axle center on the AMD 104 and a first wheel 414(1), $D_2$ is a difference between the axle center on the AMD 104 and a second wheel 414(2), and $D_3$ is a difference between the axle center on the AMD 104 and the third wheel 414(3).

Given determined coordinates for each of the AMD locations 524(1)-(3), the third set of distance values may be determined as differences between each of the coordinates for the AMD locations 524(1)-(3) and the first geographical area location 508(1). If any of the third set of distance values is greater than the first radius, then at least one portion of the AMD 104 may be outside of the first geographical area 506(1) because the first geographical area 506(1) is circular and has an area specified by a first radius. The first geographical area location 508(1) may be indicated by fifth coordinates, $(x_5,y_5)$. A fourth distance value, $d_4$, between the first geographical area location 508(1) and the first AMD location 524(1), a fifth distance value, $d_5$, between the first geographical area location 508(1) and the second AMD location 524(2), a sixth distance value, $d_6$, between the first geographical area location 508(1) and the third AMD location 524(3), may be determined using the following equations:

$$d_4=\sqrt{(x_5-x_7)^2+(y_5-y_7)^2},\quad\text{(Equation 14)}$$

$$d_5=\sqrt{(x_5-x_8)^2+(y_5-y_8)^2},\text{ and}\quad\text{(Equation 15)}$$

$$d_6=\sqrt{(x_5-x_9)^2+(y_5-y_9)^2}.\quad\text{(Equation 16)}$$

In this example, if any of $d_4$, $d_5$, or $d_6$ is greater than the first radius, then at least a portion of the AMD 104 associated with either $d_4$, $d_5$, or do is outside of the first geographical area 506(1).

The fourth set of distance values may be determined similarly to the third set of distance values, resulting in the fourth set of distance values including $d_7$, $d_8$, and $d_9$. In this example, $d_7$ is a distance between the second geographical area location 508(2) and the first AMD location 524(1), $d_8$ is a distance between the second geographical area location 508(2) and the second AMD location 524(2), and do is a distance between the second geographical area location 508(2) and the third AMD location 524(3). In this example, if any of $d_7$, $d_8$, or $d_9$ is greater than the second radius, then at least a portion of the AMD 104 associated with either $d_7$, $d_8$, or $d_9$ is outside of the second geographical area 506(2).

Continuing this example, based on the third set of distance values and the fourth set of distance values, if any of the AMD locations 524(1)-(3) are outside of both the first geographical area 506(1) and the second geographical area 506(2), then at least one portion of the AMD 104 is outside of the safe region. In this example, based on at least one AMD location being outside of the safe region, the safety module 130 stops movement of the AMD 104. Specifically, in this example, both AMD location 524(2) and AMD location 524(3) are outside of both the first geographical area 506(1) and the second geographical area 506(2).

Figure 6:
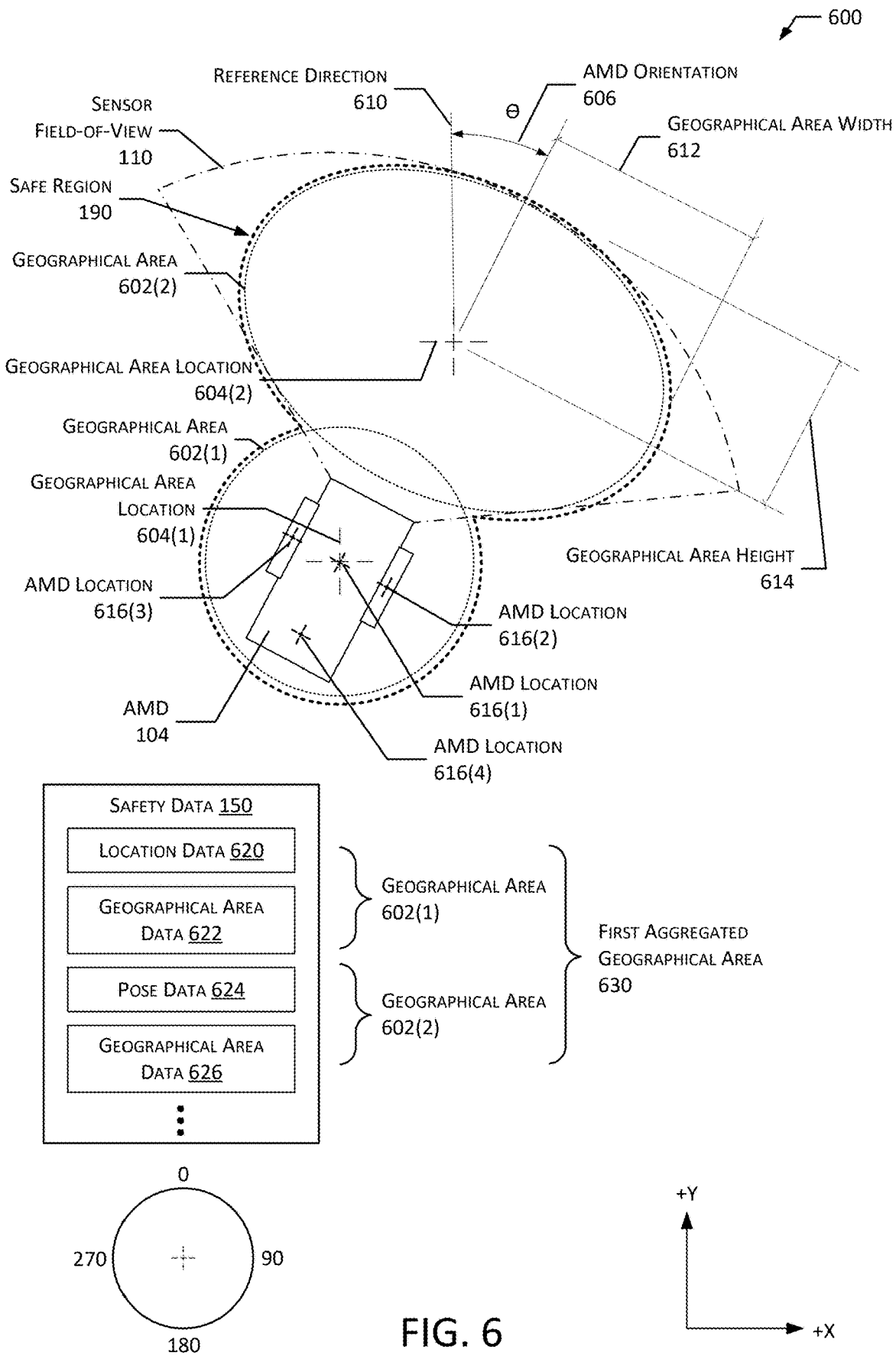
FIG. 6 illustrates the AMD relative to a safe region, according to some implementations.

FIG. 6 illustrates, at 600, the AMD 104 relative to a safe region 190, according to some implementations.

In this example, the safety module 130 may determine a first aggregated geographical area 630 based on a given location and orientation of the AMD 104. Each individual aggregated geographical area may be representative of an individual geographical area of the physical space 102. Given the first aggregated geographical area 630, the safety module 130 may, during movement outside a sensor field-of-view 110, determine whether or not a portion of the AMD 104 is outside of the first aggregated geographical area 630. In the below example, described are an example specification of the first aggregated geographical area 630 and an example calculation for determining whether a portion of the AMD 104 is within the first aggregated geographical area 630.

In this example, the AMD 104 is located at AMD location 616(1). AMD location 616(1) may be an axle center. For example, AMD location 616(1) may be determined relative to AMD locations 616(2)-(4). The location of an AMD 104 is not at any single point of the physical space 102. The AMD 104 may occupy a geographical area of the physical space 102 that is a perimeter of the AMD 104 on an X-Y plane of the physical space 102. In this example, for simplicity and for ease of explanation, the location of the AMD 104 is represented by AMD locations 616(1)-(4). A first AMD location 616(1) may be determined based on an intersection of a perpendicular line that extends from a line between a second AMD location 616(2) to a third AMD location 616(3) toward the fourth AMD location 616(4). In this example, the AMD 104 may be determined to be outside of the first aggregated geographical area 630 based on any of the AMD locations 616(1)-(4) being located outside of a perimeter of the first aggregated geographical area 630.

In some implementations, the first aggregated geographical area 630 may be specified using multiple shapes. In this example, two geometric shapes are used, a circle and an ellipse. In other examples, additional shapes, including different shapes, may be used to specify a first aggregated geographical area 630. In some implementations, an aggregated geographical area may be an aggregation of individual geographical areas associated with individual sensor fields-of-view 110. For example, the AMD 104 may comprise N sensors, and each of the N sensors may have an individual field-of-view. Each given field-of-view for each given sensor may be associated with a given effective sensor range. As described above, an effective sensor range may include a portion of the physical space 102 associated with sensor data 148 that is above a confidence threshold. A given sensor 152 may be associated with a given individual geographical area that is based on the portion of the physical space 102 associated with an effective sensor range of the given sensor. Continuing this example, the aggregated geographical area may be an aggregation of the N individual geographical areas associated with the N individual sensor fields-of-view 110. In this example, if a first sensor has a large first field-of-view, then the first individual geographical area associated with the first sensor 152 may be larger than a second individual geographical area associated with a second sensor 152 having a second field-of-view that is smaller than the first field-of-view.

As depicted in FIG. 6, the first aggregated geographical area 630 may comprise two geographical areas, a first geographical area 602(1) and a second geographical area 602(2). The first geographical area 602(1) may be indicated by location data 620 and geographical area data 622. Location data 620 may indicate a first geographical area location 604(1), and the first geographical area data 622 may indicate a first radius. The second geographical area 602(2) may be indicated by pose data 624 and second geographical area data 626. Pose data 624 may indicate the second geographical area location 604(2) and a first orientation, $\theta$. The second geographical area location 604(2) may be specified to be a constant relative distance from the first geographical area location 604(1). In this example, the first orientation and the AMD orientation 606 may be oriented with respect to the reference direction 610. The reference direction 610 is similar to reference direction 420, described with respect to FIG. 4. The second geographical area data 626 may indicate an ellipse with a first geographical area height 614 and a first geographical area width 612. In this example, at a time when the safety module 130 specifies the first aggregated geographical area 630, the first orientation is equal to the AMD orientation, depicted as AMD orientation 606.

In some implementations, the second geographical area 602(2) is based on the sensor field-of-view 110. For example, at a time when the safety module 130 determines the first aggregated geographical area 630, if sensor data 148 from the one or more sensors 152 is consistent with each other, then the first aggregated geographical area 630 is determined to include the first geographical area 602(1) and the second geographical area 602(2). Otherwise, in this example, if the sensor data 148 from the one or more sensors 152 is not consistent with each other, then the first aggregated geographical area 630 is determined to include the first geographical area 602(1) but not the second geographical area 602(2).

Given the first aggregated geographical area 630, and given AMD locations 616(1)-(4), the safety module 130 may determine whether a portion of the AMD 104 is within the first aggregated geographical area 630. In this example, a single geographical area is used, but in other examples, the safety module 130 makes similar determinations with respect to each geographical area of a safe region 190.

The relative position of the AMD 104 with respect to the first aggregated geographical area 630 may serve as a basis for describing a determination of whether the AMD 104 is inside or outside of the first aggregated geographical area 630. In this example, the AMD 104 may be at a first AMD location 616(1) and at a first orientation, θ. The first AMD location 616(1) may be indicated by first coordinates $(x_1, y_1)$. Second coordinates, $(x_2, y_2)$, for the second AMD location 616(2), third coordinates, $(x_3, y_3)$, for the third AMD location 616(3), and fourth coordinates, $(x_4, y_4)$, for the fourth AMD location 616(4) may be determined similar to determining the second, third, and fourth coordinates relative to the first AMD location 402(1), described in FIG. 4.

Continuing with this example, the safety module 130 determines whether the AMD locations 616(2)-(4) are within both the first geographical area 602(1) and the second geographical area 602(2). To determine whether the AMD locations 616(2)-(4) are within the first geographical area 602(1), the safety module 130 determines a first set of distances indicating a distance between each AMD location 616(2)-(4) and the first geographical area location 604(1). In this example, to determine whether the AMD locations 616(2)-(4) are within the first geographical area 602(1), the safety module 130 determines whether any of the distances of the first set of distances is greater than the first radius. If any of the distances of the first set of distances is greater than the first radius, then the safety module 130 determines that at least one portion of the AMD 104 is outside of the first geographical area 602(1).

In this example, to determine whether the AMD locations 616(2)-(4) are within the second geographical area 602(2), the safety module 130 determines, for each AMD location 616(2)-(4), whether the coordinates for a given AMD location 616(2)-(4) satisfy the following equation:

$$\frac{(\cos\theta \times (x_A - x_E) + \sin\theta \times (y_A - y_E))^2}{H^2} + \frac{((\sin\theta \times (x_A - x_E) - \cos\theta \times (y_A - y_E))}{W^2} \leq 1. \quad \text{(Equation 17)}$$

In this example, θ is the orientation of the second geographical area 602(2), H is the geographical area height 614, W is the geographical area width 612, $(x_A, y_A)$ are coordinates of a given AMD location, $(x_E, y_E)$ are coordinates of the second geographical area location 604(2). The $(x_A, y_A)$ coordinates may be the coordinates for the AMD locations 616(2)-(4), including second coordinates, $(x_2, y_2)$, third coordinates, $(x_3, y_3)$, and the fourth coordinates $(x_4, y_4)$. In this example, if, for coordinates of given AMD locations 616(2)-(4), the above equation 17 is true, then the safety module 130 determines that the given AMD location 616(2)-(4) is within the second geographical area 602(2). If the AMD locations 616(2)-(4) are outside of all geographical areas of the safe region 190, then the safety module 130 may stop movement of the AMD 104.

Figure 7:
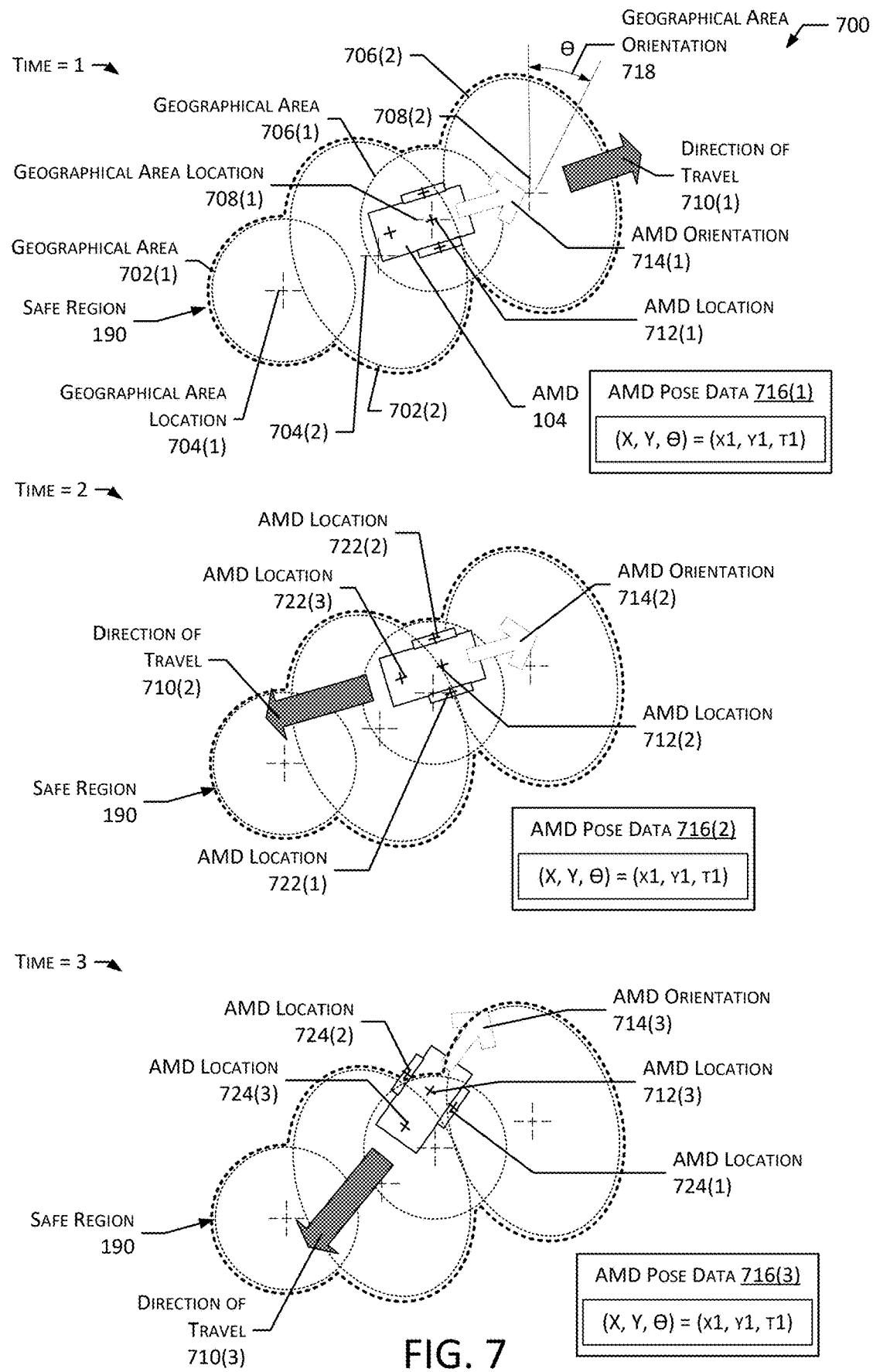
FIG. 7 illustrates the AMD using a safe region for safe movement outside a sensor field-of-view, according to some implementations.

FIG. 7 illustrates, at 700, the AMD using a safe region 190 for safe movement outside a sensor field-of-view 110, according to some implementations.

In this example, the AMD 104 uses a safe region 190 to safely navigate in a direction that is outside of the field-of-view of one or more sensors 152. The AMD 104 may be moving within a geographical area, such as the physical space 102. The AMD 104 may have one or more sensors 154 with a sensor field-of-view 110 that includes a first direction of travel 710(1). The AMD 104 may determine pose data at different times. For example, the AMD 104 may determine pose data based on localization data, as described above. As another example, the AMD 104 may determine pose data relative to a previous location, such as a location for a most recent geographical area of the safe region.

The safety data 150 may include location data, geographical area data, or pose data for each of the geographical areas of the safe region. In this implementation, each geographical area of the safe region 190 comprises multiple geographical areas. For example, the first geographical area may comprise geographical areas 702(1)-(2), and the second geographical area may comprise geographical areas 706(1)-(2). Geographical area 702(1) is located at geographical area location 704(1), and geographical area 702(2) is located at geographical area location 704(2). Geographical area 706(1) is located at geographical area location 708(1), and geographical area 706(2) is located at geographical area location 708(2). Geographical area 702(1) and geographical area 706(1) are circular and specified by a first radius. Geographical area 702(2) and geographical area 706(2) are elliptical and are specified by a first height, a first width, and a first geographical area orientation 718.

At a first time, time=1, the AMD 104 travels forward with the use of sensor data 148 and an occupancy map. As the AMD 104 travels forward, a safe region 190 is determined to be clear of obstacles that may obstruct travel. In this example, the safe region 190 includes the first geographical area and the second geographical area, described above. In other examples, the safe region 190 may include more of fewer geographical areas.

Further at the first time, the AMD 104 may be moving in a first direction of travel 710(1). The AMD 104 may have a first AMD orientation 714(1) and a first AMD location 712(1). As discussed above, AMD pose data 716 may be relative to a previous location or may be relative to an origin. A distance and orientation relative to a previous location may be based on motor encoder data. The motor encoder data may indicate an amount of rotation of each wheel of the AMD 104, where the amount of rotation, given a wheel radius, may be used to determine a distance traveled. An orientation relative to a previous location may be determined based on a difference between a first rotation of a first wheel and a second rotation of a second wheel. Pose data relative to an origin may be based on localization data relative to the origin, such as a dock 160, or such as a fixed object within the physical space 102.

Before the second time, time=2, the AMD 104 may have determined an instruction and may have begun to move in a direction that is outside the sensor FOV 110. At the second time, the AMD 104 may use the safe region 190 to determine whether the AMD 104 is within an aggregate geographical area comprising each geographical area of the safe region. To determine whether one or more portions of the AMD 104 have moved outside of any of the geographical areas of the safe region, the safety module 130 may determine whether portions of the AMD 104 associated with one or more AMD locations 722 are within the safe region. To determine whether any of the first AMD location 722(1), second AMD location 722(2), or third AMD location 722(3) are outside of both the first geographical area and the second geographical area, the safety module 130 determines values for the equations described above with respect to FIG. 6.

At the second time, time=2, the safety module 130 determines whether any of the AMD locations 722(1)-(3) are outside of all of the geographical areas of the safe region, which in this example, includes the first geographical area and the second geographical area. Given the first geographical area and given AMD locations 722(1)-(3), the safety module 130 may determine whether a portion of the AMD 104 is within the first geographical area. The safety module 130 performs a similar determination to determine whether a portion of the AMD 104 is within the second geographical area.

In this example, the relative position of the AMD 104 with respect to the first geographical area may serve as a basis for the safety module 130 to determine whether the AMD 104 is inside or outside of the first geographical area. In this example, the AMD 104 may be at a second AMD location 712(2), indicated by coordinates $(x_A, y_A)$, and at a second orientation, $\theta$. The first AMD location 722(1) may be indicated by first coordinates, $(x_1, y_1)$, second coordinates, $(x_2, y_2)$, for the second AMD location 722(2), third coordinates, $(x_3, y_3)$, for the third AMD location 722(3), may be determined similar to determining the second, third, and fourth coordinates relative to the first AMD location 402(1), described in FIG. 4.

Continuing with this example, the safety module 130 determines whether the AMD locations 722(1)-(3) are within both the first geographical area and the second geographical area. To determine whether the AMD locations 722(1)-(3) are within geographical area 702(1) of the first geographical area, the safety module determines a first set of distances indicating a distance between each AMD location 722(1)-(3) and the first geographical area location 704(1). In this example, to determine whether the AMD locations 722(1)-(3) are within geographical area 702(1), the safety module 130 determines whether any of the distances of the first set of distances is greater than the first radius. If any of the distances of the first set of distances is greater than the first radius, then the safety module 130 determines that at least one portion of the AMD 104 is outside of geographical area 702(1).

In this example, to determine whether the AMD locations 616(2)-(4) are within the geographical area 702(2) of the first geographical area, the safety module 130 determines, for each AMD location 722(1)-(3), whether the coordinates for a given AMD location 722(1)-(3) satisfy the following equation:

$$\frac{(\cos\theta \times (x_A - x_E) + \sin\theta \times (y_A - y_E))^2}{H^2} + \frac{((\sin\theta \times (x_A - x_E) - \cos\theta \times (y_A - y_E))}{W^2} \leq 1. \quad \text{(Equation 17)}$$

In this example, $\theta$ is the orientation of the geographical area 702(2), H is the geographical area 702(2) height, W is the geographical area 702(2) width, $(x_A, y_A)$ are coordinates of a given AMD location, $(x_E, y_E)$ are coordinates of the geographical area location 702(2). The $(x_A, y_A)$ coordinates may be the coordinates for the AMD locations 722(1)-(3), including first coordinates $(x_1, y_1)$, for the first AMD location 722(1), second coordinates, $(x_2, y_2)$, for the second AMD location 722(2), third coordinates, $(x_3, y_3)$, for the third AMD location 722(3). In this example, if, for coordinates of a given AMD location 722(1)-(3), the above equation 17 is true, then the safety module 130 determines that the given AMD location 722(1)-(3) is within geographical area 702(2).

As noted above, the safety module 130 performs a similar determination to determine whether a portion of the AMD 104 is within the second geographical area. In this example, at the second time, all AMD locations 722(1)-(3) are within at least one geographical area of the safe region.

At the third time, time=3, the safety module 130 determines whether any of the AMD locations 724(1)-(3) are outside all of the geographical areas of the safe region, which in this example, includes the first geographical area and the second geographical area. Given the first geographical area, and given AMD locations 724(1)-(3), the safety module 130 may determine whether a portion of the AMD 104 is within the first geographical area. The safety module 130 performs a similar determination to determine whether a portion of the AMD 104 is within the second geographical area.

In this example, the AMD 104 is moving in the third direction of travel 710(3) and is at a third AMD location 712(3). The safety module 130, similar to the determinations at the second time, determines whether any of the AMD locations 724(1)-(3) are outside any of the geographical areas of the safe region, which includes the first geographical area and the second geographical area. In this example, the second AMD location 724(2) is outside of all geographical areas of the safe region. Continuing this example, based on at least one portion of the AMD 104 being outside of the safe region, the safety module 130 stops movement of the AMD 104.

Figure 8:
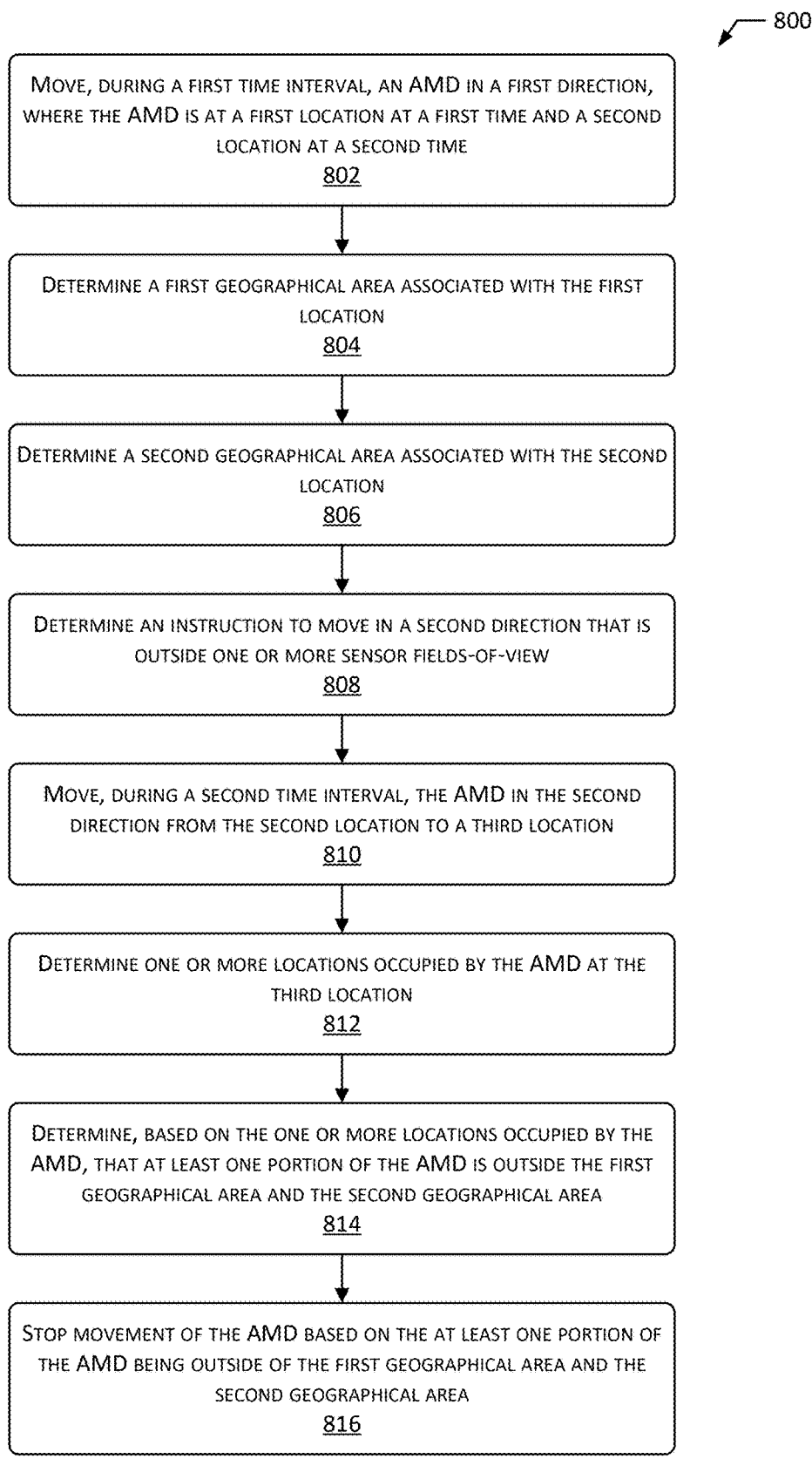
FIG. 8 illustrates a flow diagram for safe movement outside a sensor field-of-view, according to some implementations.

FIG. 8 illustrates, at 800, a flow diagram for movement outside a sensor field-of-view 110, according to some implementations.

In this example, the AMD 104 uses a safe region 190 comprising a set of geographical areas to safely navigate in a direction that is outside of the field-of-view of one or more sensors 152. The AMD 104 may be moving within a geographical area, such as the physical space 102. The AMD 104 may have one or more sensors 152 with a sensor field-of-view 110 that includes a first direction of travel. The AMD 104 may determine pose data at different times. For example, the AMD 104 may determine pose data based on localization data, as described above. As another example, the AMD 104 may determine pose data relative to a previous location, such as a location for a most recent geographical area of the safe region.

At 802, the AMD 104 may move in a first direction, where the AMD 104 is at a first location at a first time and at a second location at a second time. The AMD 104 may move during a first time interval that includes the first time and the second time. With respect to FIG. 1, the AMD 104 may move within the physical space 102 in a first direction of travel 114(1). The AMD 104 may use an occupancy map and sensor data 148 to determine a path through the physical space 102. The sensor data 148 may be used to determine one or more distances to one or more objects within the physical space 102. The one or more distances may be used to determine localization data and to determine obstacles within the physical space 102. The localization data, obstacle data, and the occupancy map may be used by the AMD 104 to move in the first direction along a path. At 804 and 806, the safety module 130 may use sensor data 148 determined during the first time interval to determine individual geographical areas associated with individual locations along the first path. The sensor data 148 may indicate that the individual locations are clear of obstacles. The sensor data 148 may be determined during the first time interval, where the sensor FOV 110 at a given time may be dependent upon a pose of the AMD 104 at the given time. A sensor FOV 110 may be different at the first time than the sensor FOV 110 at the second time. For example, at the first time, the sensor FOV may be an open area of a living room of the physical space 102. At the second time, after the AMD 104 turns, the sensor FOV 110 may include a table, chair, or some other object within the physical space 102. The individual geographical areas may comprise the first geographical area and the second geographical area.

At 804, the safety module 130 may determine a first geographical area associated with the first location. For example, at the first time, the first geographical area may be associated with a first location along the path, and the safety module 130 may include the first geographical area in the safe region 190 after every X meters have been traveled by the AMD 104. In some examples, X may be 0.2 meters, but may be greater than or less than 0.2 meters in other examples.

At 806, the safety module 130 may determine a second geographical area associated with the second location. For example, at the second time, the second geographical area may be associated with a second location along the path, and the safety module 130 may include the second geographical area in the safe region 190 after X meters from the first location have been traveled by the AMD 104.

At 808, the AMD 104 may determine an instruction to move in a second direction that is outside one or more sensor fields-of-view 110. For example, the AMD 104 may receive a command from a user or a device to move in the second direction. As another example, the AMD 104 may encounter an obstacle and may not have sufficient space in which to rotate or turn around. The instruction to move in the second direction may be part of multiple instructions to move the AMD 104 in the second direction. In this example, the AMD 104 may lack aft sensors, and movement in the second direction may be outside of the field-of-view of the sensors 152 on the front of the AMD 104. In this example, the AMD 104 may use the occupancy map to determine a path in a direction that is outside the sensor FOV 110. In this example, the safety module 130 determines, during movement of the AMD 104 along the path in the direction that is outside the sensor FOV 110, whether the AMD 104 has moved outside the safe region. In other examples, the AMD 104 may use both the occupancy map and locations and geographical areas of the safe region 190 to determine a path that maintains the space occupied by the AMD 104 within the safe region.

At 810, the AMD 104 may move, during a second time interval, in the second direction from the second location to a third location. For example, the AMD 104 may determine instructions for the motor control module 132 to move the wheels 414 of the AMD 104 in the second direction along the path. In this example, the second direction is outside the sensor FOV 110 from the AMD 104 during the second time interval. In this example, movement of the AMD 104 along the path results in the AMD 104 moving to the third location.

In some implementations, at 812, the safety module 130 may determine one or more locations occupied by the AMD 104 at the third location. For example, the AMD 104 may use three AMD locations to determine a geographical area occupied by the AMD 104. The three AMD locations may be associated with different portions of the AMD 104, such as one or more locations along a perimeter of the AMD 104, locations of the wheels 414, or some other location associated with some other portion of the AMD 104. In this example, the one or more locations may be a first location associated with a first wheel 414(1), a second location associated with a second wheel 414(2), and a third location associated with a third wheel 414(3). As discussed above with respect to FIG. 5, given pose data for the AMD 104 at a given location, the safety module 130 may determine first coordinates for the first location, second coordinates for the second location, and third coordinates of the third location. In this example, the given location may be the third location.

In some implementations, at 814, the safety module 130 may determine, based on the one or more locations occupied by the AMD 104, that at least one portion of the AMD 104 is outside of the first geographical area and the second geographical area. For example, the first geographical area may be at a first location, and the second geographical area may be at a second location. As discussed above with respect to FIG. 5, given coordinates to the locations occupied by the AMD 104, geographical area data and location data for each geographical area of the safe region 190 may be used to determine whether a given location is outside of a given geographical area. For example, the safety module 130 may use the first coordinates of the first location and coordinates of the first geographical area location to determine a first distance between the first AMD location and the first geographical area location. The safety module 130 may similarly determine a second distance between the second AMD location and the first geographical area location, and a third distance between the third AMD location and the first geographical area location. Similarly, the safety module 130 may determine a fourth distance between the first AMD location and the second geographical area location, a fifth distance between the second AMD location and the second geographical area location, and a sixth distance between the third AMD location and the second geographical area location.

Continuing this example, the first geographical area may be circular and specified by a first radius, and the second geographical area may be circular and specified by a second radius. As discussed with respect to FIG. 6, other area shapes may be used. In this example, if any of the first distance, second distance, or third distance is greater than the first radius, then at least one portion of the AMD 104 is outside of the first geographical area. Similarly, if any of the fourth distance, fifth distance, or sixth distance is greater than the second radius, then at least one portion of the AMD 104 is outside of the second geographical area. In this example, similar to FIG. 5, at least one portion of the AMD 104 is outside of both the first geographical area and the second geographical area.

At 816, the safety module 130 may stop movement of the AMD 104 based on the at least one portion of the AMD 104 being outside of the first geographical area and the second geographical area. For example, the safety module 130 may stop the AMD 104 by one or more of inhibiting operations of one or more of the motors 142, issuing a command to stop motor operation, or disconnecting power from one or more of the motors 142.

Figure 9:
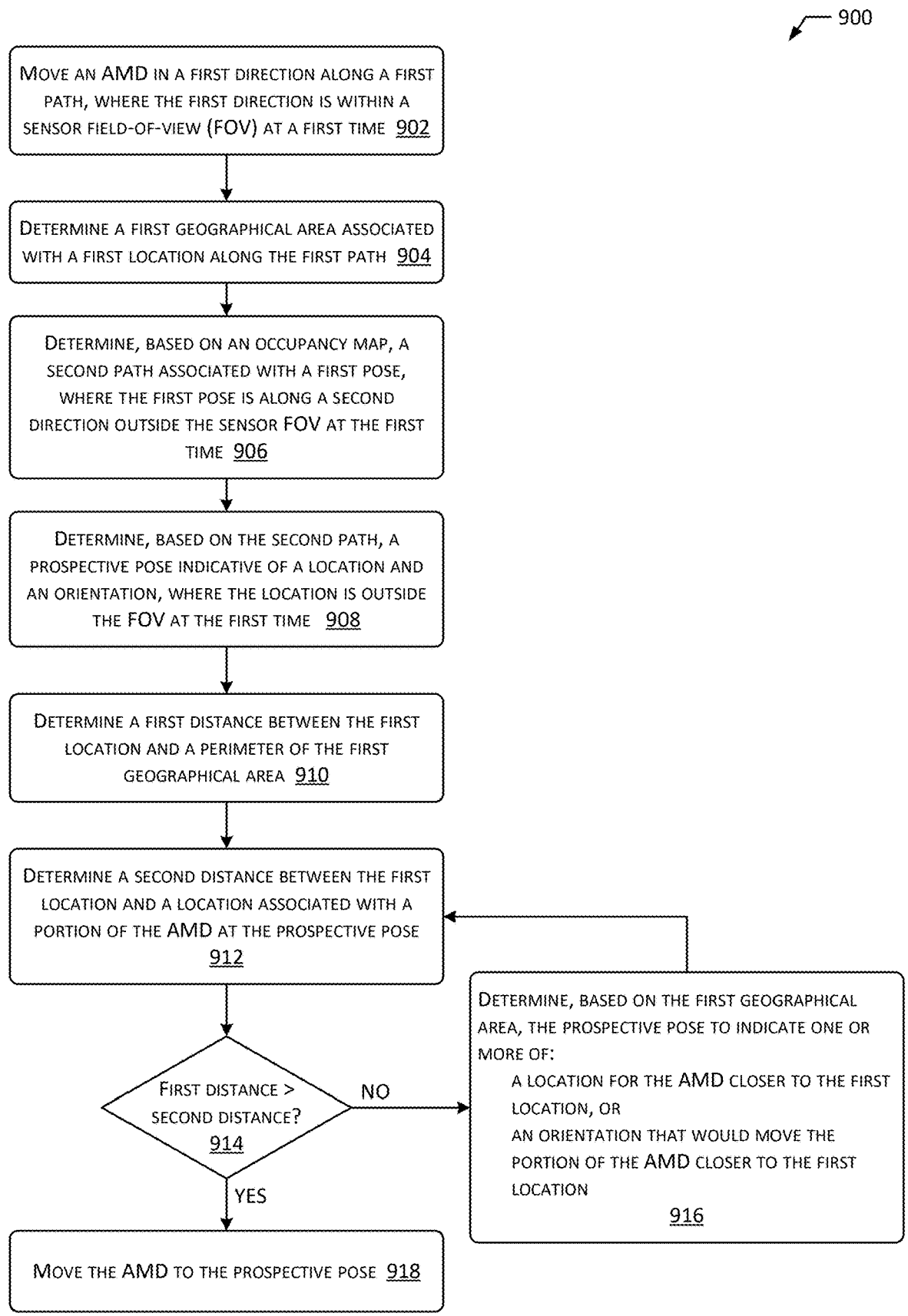
FIG. 9 illustrates a flow diagram for safe movement outside a sensor field-of-view, according to some implementations.

FIG. 9 illustrates a flow diagram 900 for movement outside a sensor field-of-view 110, according to some implementations.

In general, the autonomous navigation module 154 may use an occupancy map to determine a path for the AMD 104. For example, given a destination pose, the autonomous navigation module 154 may determine a path from a current pose to the destination pose that avoids obstacles in the physical space 102 as indicated by the navigation map 248. Given a path, the autonomous navigation module 154 may determine a set of poses for the AMD 104 with respect to the path. As the AMD 104 moves to assume each pose of the set of poses, the AMD 104 makes progress along the path. The set of poses may include a first pose that indicates a first location and a first orientation.

In this example, before movement along the path, the safety module 130 may determine whether the movement to the first pose would result in the AMD 104 moving outside the safe region. If the safety module 130 determines that movement would result in the AMD 104 moving outside the safe region, then the safety module 130 may prevent the AMD 104 from moving. If the safety module 130 determines that movement would result in the AMD 104 moving outside the safe region, the safety module 130 or the autonomous navigation module 154 may determine the first pose to indicate a second location and a second orientation. The second location may be closer to a center of a nearest geographical area of the safe region. The second orientation may be rotation of the AMD 104 that results in a location associated with the AMD 140 being closer to the center of the nearest geographical area of the safe region. The location associated with the AMD 140 may be a portion of the AMD 104 associated with one or more of: an area along a perimeter of the structure, an attachment to the structure, a location at a specified distance from the structure, or a perimeter of the chassis.

At 902, the AMD 104 may move in a first direction along a first path, where the first direction is within a field-of-view (FOV) 110 of a sensor 152 at a first time. For example, with respect to FIG. 1, the AMD 104 may move within the physical space 102 in a first direction of travel 114(1). The AMD 104 may use an occupancy map and sensor data 148 to determine the first path through the physical space 102. The sensor data 148 may be used to determine one or more distances to one or more objects within the physical space 102. The one or more distances may be used to determine localization data and to determine obstacles within the physical space 102. The localization data, obstacle data, and the occupancy map may be used by the AMD 104 to determine the first path. Given the first path, the AMD 104 may move in the first direction along the first path.

At 904, the safety module 130 may determine a first geographical area associated with a first location along the path. For example, the first geographical area may be associated with the first location, and the safety module 130 may include the first geographical area in the safe region 190 after every X meters have been traveled by the AMD 104. In some examples, X may be 0.2 meters, but may be greater than or less than 0.2 meters in other examples. In some examples, the first geographical area is circular, and the first location may be a center of the circle, as described with respect to FIG. 5.

At 906, the autonomous navigation module 154 may determine, based on an occupancy map of the physical space 102, a second path associated with a first pose, where the first pose is along a second direction outside the FOV 110 from the sensor 152 at the first time. For example, the AMD 104 may receive a command from a user or a device to move in the second direction. As another example, the AMD 104 may encounter an obstacle and may not have sufficient space in which to rotate or turn around. The autonomous navigation module 154 may determine the second path to indicate a set of poses for the AMD 104, including the first pose. Each pose may indicate a location and an orientation for the AMD 104. As the AMD 104 moves to assume each pose of the set of poses, the AMD 104 makes progress along the second path. The set of poses may include a first pose that indicates a third location and a first orientation. The third location may be in the second direction, where the third location and the second direction may be outside the FOV 110 from the sensor 152 at the first time. A given direction may be outside a FOV 110 from the sensor 152 at the first time if sensor data determined as the AMD 104 moves in the given direction does not indicate reliable information regarding whether objects or obstacles are present in the given direction.

At 908, the autonomous navigation module 154 may determine, based on the second path, a prospective pose indicative of a location and an orientation, where the location is outside the FOV 110 from the sensor 152 at the first time. A prospective pose may be an expected pose for the AMD 104 if the AMD 104 were to move to the location and orientation indicated by the prospective pose. For example, prior to moving to a first pose, the prospective pose may be the first pose as determined at step 906 as part of the autonomous navigation module 154 determining the second path.

At 910, and before the AMD 104 moves in a direction outside the FOV 110 from the sensor 152 at the first time, the safety module 130 may determine a first distance between the first location and a perimeter of the first geographical area. At 912, the safety module determines a second distance between the first location and a location associated with a portion of the AMD 104 at the prospective pose. If the first distance is greater than the second distance, then the perimeter of the first geographical area encompasses at least the portion of the AMD 104 at the prospective pose because the portion is closer to the first location than the perimeter is to the first location. In this example, for simplicity, a single portion of the AMD 104 is considered, but as described with respect to FIG. 4, multiple portions of the AMD 104, and multiple corresponding locations for the portions are considered. The multiple portions may include the structure, a mechanical arm, a moveable display, telescoping attachments, and so forth.

Continuing step 910, the first geographical area may be circular and a perimeter of the first geographical area may be indicated by a radius of the first geographical area. The radius of the first geographical area may be associated with a distance value, such as 1.0 meter. In some examples, the radius of a geographical area may be specified as described with respect to FIG. 4. As another example, a geographical area may be specified by a polygon, one or more polygons, an oval, another geometric shape, or combination of geometric shapes. FIG. 6 describes a geographical area that comprises multiple individual geographical areas, where the individual geographical areas are specified by different shapes.

At 912, and before the AMD 104 moves in a direction outside the FOV 110 from the sensor 152 at the first time, the safety module 130 may determine the second distance between the first location and a location associated with a portion of the AMD at the prospective pose. For example, the prospective pose may indicate a prospective location and a prospective orientation for the AMD 104. Based on the prospective location and the prospective orientation of the AMD 104, as described with respect to FIG. 4, a second distance may be determined to indicate a distance between the first location and a location associated with a portion of the AMD 104 at the prospective location. For example, the portion of the AMD 104 may be a wheel location, such as wheel location 402(2), and based on coordinates of the prospective location of the AMD 104, the location associated with the portion of the AMD 104 may be determined, as described with respect to FIG. 4. The safety module 130 may determine the second distance based on a difference between the first location and the location associated with the portion of the AMD 104 at the prospective pose.

At 914, and before the AMD 104 moves in a direction outside the FOV 110 from the sensor 152 at the first time, the safety module 130 may determine whether the first distance is greater than the second distance. If the first distance is greater than the second distance, then the portion of the AMD 104 is inside of the radius of the first geographical area and the process continues at 918. If the first distance is less than or equal to the second distance, then the portion of the AMD 104 is outside of the radius of the first geographical area and movement to the prospective pose may result in an unsafe condition. If the first distance is less than or equal to the second distance, the safety module 130 may modify the prospective pose so that movement to the prospective pose does not place the portion of the AMD 104 outside of the first geographical area. In this example, if the first distance is less than or equal to the second distance, then the process continues at 916.

At 916, and before the AMD 104 moves in a direction outside the FOV 110 from the sensor 152 at the first time, the safety module 130 may determine, based on the first geographical area, the prospective pose to indicate one or more of: a location for the AMD 104 that is closer to the first location, or an orientation for the AMD 104 that would move the portion of the AMD 104 closer to the first location. For example, the safety module 130 may determine the prospective pose to indicate a next prospective location that is X % closer to the first location than a current prospective location. In some examples, X may be 5, but in other examples, X may be more or less than 5. In some examples, the safety module 130 may update only a prospective location and continue the process at 912. In other examples, the safety module 130 may update only a prospective orientation and continue the process at 912. For example, the safety module 130 may determine the prospective pose to indicate a next prospective orientation that would move the portion of the AMD 104 closer to the first location. For example, if the prospective orientation, $\theta_1$, is 20°, and a prospective orientation of $\theta_2 = Y \times \theta_1$ results in the first portion moving closer to the first location, the safety module may determine the prospective orientation to indicate $\theta_2$. In this example, Y may be 0.95, but in other examples, Y may be more or less than 0.95. In other examples, the safety module 130 may determine a prospective pose to indicate both a location for the AMD 104 that is closer to the first location and an orientation that would move the portion of the AMD 104 closer to the first location. Given an updated value or values for the prospective pose, the process may return to 912.

At 918, the AMD 104 may move to the prospective pose. For example, a difference between a current pose and the prospective pose may indicate a distance and a direction for moving the AMD 104 to be in the prospective pose. Given the distance and direction based on the difference between the current pose and the prospective pose, the AMD 104 may determine an amount to rotate one or more wheels to move the AMD 104.

Figure 10:
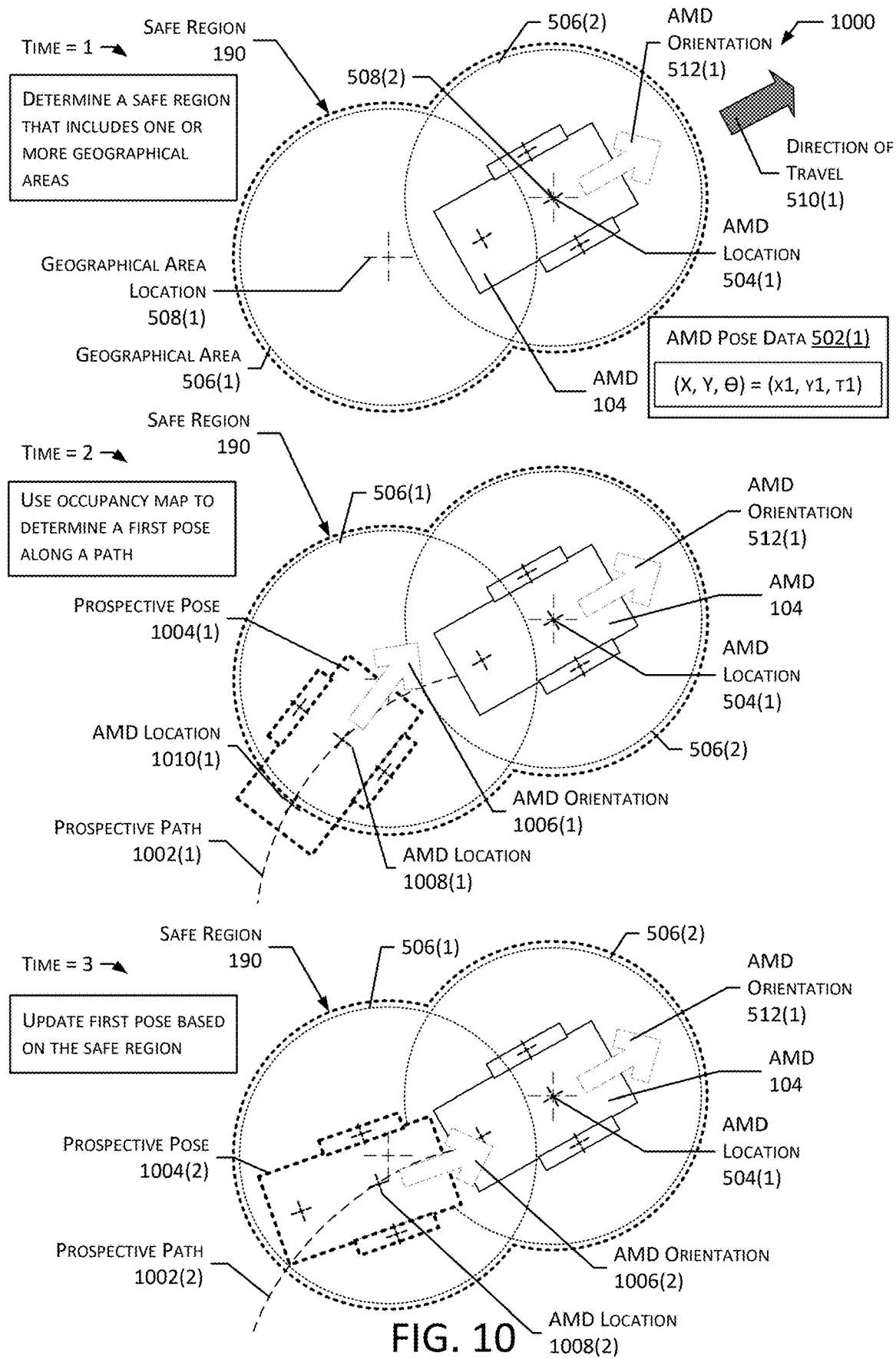
FIG. 10 illustrates the AMD using a safe region for safe movement outside a sensor field-of-view, according to some implementations.

FIG. 10 illustrates, at 1000, the AMD 104 using a safe region 190 for safe movement outside a sensor field-of-view 110, according to some implementations.

In this example, the AMD 104 uses a safe region 190 comprising a set of geographical areas to safely navigate in a direction that is outside of the field-of-view of one or more sensors 152. The AMD 104 may be moving within the physical space 102. The AMD 104 may have one or more sensors 152 with a sensor field-of-view 110 that includes a first direction of travel 510(1). At some point, the AMD 104 may determine an instruction that results in the AMD 104 moving in a direction that is outside the sensor FOV 110. For example, the AMD 104 may encounter an obstacle that may prevent further movement in the first direction that is within the sensor FOV 110.

At a first time, time=1, the AMD 104 may be at the first location, depicted as AMD location 504(1). As the AMD 104 travels forward, a safe region 190 comprising a set of geographical areas is determined to be clear of obstacles that may obstruct travel. In this example, the safe region 190 includes two geographical areas, geographical areas 506(1)-(2). In other examples, the safe region 190 may include more of fewer geographical areas. At the first time, the AMD 104 may be moving in a first direction of travel 510(1). The AMD 104 may have a first AMD orientation 512(1) and a first AMD location 504(1). The AMD pose data 502(1) may be indicative of the first AMD location 504(1) and the first AMD orientation 512(1).

At the second time, time=2, the AMD 104 may use the occupancy map to determine a first prospective pose. For example, the AMD 104 may have determined an instruction to move in a second direction that is outside the sensor FOV 110 but has not yet moved in the second direction. In response to determining to move in the second direction, the autonomous navigation module 154 may use an occupancy map to determine a first prospective path 1002(1) for the AMD 104 to move in a second direction to a second location. The second direction may be outside of the sensor FOV 110. The autonomous navigation module 154 may determine the first prospective path 1002(1) based on a set of poses for the AMD 104. As the AMD 104 moves to assume each pose of the set of poses, the AMD 104 moves in a direction outside the sensor FOV. The set of poses may include a first pose that indicates a third AMD location 1008(1) and a first AMD orientation 1006(1). The first pose of the set of poses is indicated as first prospective pose 1004(1). Before movement in a direction outside the sensor FOV, the safety module 130 may determine whether the movement to the first prospective pose 1004(1) would result in one or more portions of the AMD 104 moving outside the safe region 190 comprising geographical areas 506(1)-(2).

For example, based on the third AMD location 1008(1) and the first AMD orientation 1006(1) of the AMD 104, and as described with respect to FIG. 4, a second distance may be determined to indicate a distance between the first AMD location 504(1) and a location associated with a first portion of the AMD 104 at the first prospective pose 1004(1). For example, the first portion of the AMD 104 may be a wheel location, such as wheel location 402(2), and based on coordinates of the first prospective location of the AMD 104, the location associated with the first portion of the AMD 104 may be determined, as described with respect to FIG. 4. The safety module 130 may determine the second distance based on a difference between the first AMD location 504(1) and the AMD location 1010(1) associated with the first portion of the AMD 104 at the first prospective pose 1004(1). In this example, the AMD location 1010(1) is associated with the first portion of the AMD 104 that is associated with a location of a wheel 412(3) described with respect to FIG. 4. In this example, the safety module 130 may determine that the first portion of the AMD 104 is outside of the safe region 190 based on AMD location 1010(1) being outside of the safe region.

At the third time, time=3, the safety module 130 may update the first prospective pose 1004(1) based on the safe region 190 that is safe for traversal. For example, in response to the first prospective pose 1004(1) resulting in the first portion of the AMD 104 being outside of the safe region, the safety module 130 may determine a second prospective pose 1004(2). For example, the safety module 130 may determine, based on the safe region, the second prospective pose 1004(2) to indicate either: a second prospective location for the AMD 104 that is closer to the first prospective AMD location 1008(1); a second AMD orientation 1006(2) for the AMD 104 that would move the portion of the AMD 104 closer to the first location than the first AMD orientation 1006(1); or both a second prospective AMD location 1008(2) for the AMD 104 that is closer to the first location and a second prospective AMD orientation 1006(2) for the AMD 104 that would move the portion of the AMD 104 closer to the first location. For example, the safety module 130 may determine the second prospective location 1008(2) that is X % closer to the first location than the first prospective AMD location 1008(1). In some examples, X may be 5, but in other examples, X may be more or less than 5. The safety module 130 may determine the second prospective AMD orientation 1006(2) as an orientation that would move the portion of the AMD 104 closer to the first location. For example, if the first prospective orientation, $\theta_1$, is 80°, and a prospective orientation of $\theta_2 = Y \times \theta_1$ results in the first portion moving closer to the first location, the safety module 130 may determine the second prospective orientation to indicate $\theta_2$. In this example, Y may be 0.95, but in other examples, Y may be more or less than 0.95.

Continuing this example, the safety module 130 may determine whether the first portion of the AMD 104 is within the safe region 190 based on the second prospective AMD location 1008(2) and the second prospective AMD orientation 1006(2) indicated by the second prospective pose 1004(2). In this example, the second prospective pose 1004(2) would result in the first portion of the AMD 104 being within the safe region. Based on the second prospective pose resulting in the first portion of the AMD 104 being within the safe region, the AMD 104 may move to the second prospective pose 1004(2). At the second prospective pose 1004(2), the process may repeat until the AMD 104 arrives at the second location.

Figure 11:
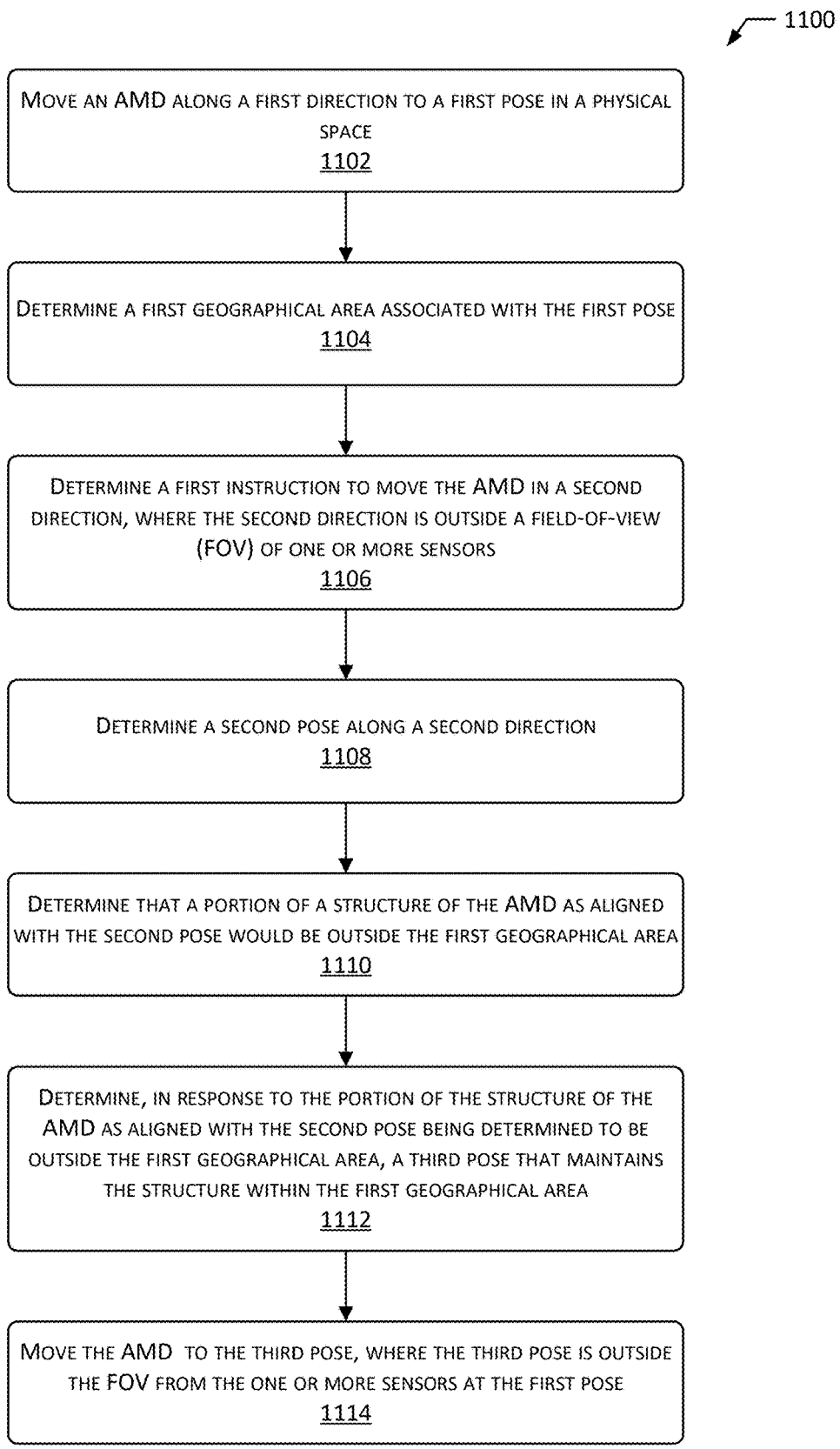
FIG. 11 illustrates a flow diagram for safe movement outside a sensor field-of-view, according to some implementations.

FIG. 11 illustrates a flow diagram 1100 for movement outside a sensor field-of-view 110, according to some implementations.

In this example, the autonomous navigation module 154 may determine to move the AMD 104 in a direction that is outside a sensor field-of-view 110, and prior to moving, the safety module 130 checks whether the move would result in the AMD 104 moving outside the safe region 190 determined to be safe for traversal. This example is similar to the example described above with respect to FIG. 9. However, in this example, the safety module 130 provides a check prior to executing an instruction for the AMD 104 to move.

At 1102, the AMD 104 may move along a first direction to a first pose in a physical space. For example, the AMD 104 may move in the first direction to a first location in a physical space 102, where the first direction is within a sensor field-of-view (FOV) 110. For example, with respect to FIG. 1, the AMD 104 may move within the physical space 102 in a first direction of travel 114(1). The AMD 104 may use an occupancy map and sensor data 148 to determine a first path through the physical space 102. The sensor data 148 may be used to determine one or more distances to one or more objects within the physical space 102. The one or more distances may be used to determine localization data and to determine obstacles within the physical space 102. The localization data, obstacle data, and the occupancy map may be used by the AMD 104 to determine the first path. The first path may comprise a first pose. Given the first path, the AMD 104 may move in the first direction to the first pose.

At 1104, the safety module 130 may determine a first geographical area associated with the first pose. For example, the first pose may indicate a first location, and the first geographical area may be associated with the first location. In some examples, the first geographical area is circular, and the first location may be a center of the circle, as described with respect to FIG. 5.

At 1106, the AMD 104 may determine a first instruction to move the AMD in a second direction. For example, the AMD 104 may determine a first instruction to move the AMD 104 a first distance in the second direction, where the second direction is outside a FOV of the one or more sensors 152 at the first pose. For example, the first instruction may have been determined in response to a user command, a determination to move along a path determined by an autonomous navigation module 154, or detection of an obstacle along the path that prevents the AMD 104 from traveling through, over, or around, and so forth. In one example, the first instruction may be an instruction indicating an amount of rotation of each wheel 414 of the AMD 104. In some examples, the first instruction may be part of moving the AMD 104 towards a pose along a path determined by the autonomous navigation module 154.

At 1108, the safety module 130 may determine a second pose along the second direction. The second direction may be outside the FOV from the sensor 152 at the first pose. For example, the safety module 130 may determine a second location of the AMD 104 that would result from movement of the AMD 104 by the first distance in the second direction. For example, the safety module 130 may determine the second location of the AMD 104 based on the second location being a first distance away from the first location in the second direction. The second pose may be based on the second location and the second direction.

At 1110, the safety module 130 may determine that a portion of a structure of the AMD 104 as aligned with the second pose would be outside the first geographical area. As discussed with respect to FIG. 1, a footprint of the AMD 104 may be indicated by a floor surface area that includes a perimeter of the structure of the AMD 104. In this example, the safety module 130 determines whether the footprint of the AMD 104, as aligned with the second pose, is within the safe region 190. The footprint as aligned with the second pose may be indicative of the footprint of the AMD 104 if the AMD 104 were at the second pose. Determining whether the footprint of the AMD 104 as aligned with the second pose is within the safe region 190 may comprise determining that the portion of the structure of the AMD 104 at the second pose would be outside the first geographical area.

For example, the safety module 130 may determine a second distance based on a distance between the first location and a perimeter of the first geographical area. The safety module 130 may also determine a third distance based on a difference between the first location and a location associated with a first portion of the AMD 104. The second distance and the third distance may be determined as described with respect to FIG. 4. In this example, because the third distance is greater than the second distance, the first portion of the AMD 104 would be outside of the first geographical area if the AMD 104 were to move in accordance with the first instruction.

At 1112, the safety module 130 may determine, based on the portion of the structure being determined to be outside the first geographical area, a third pose that maintains the structure within the first geographical area. For example, the safety module 130 may determine one of: a fourth distance based on a distance the first portion is outside of the first geographical area; a third direction based on an orientation for the AMD 104 that would move the first portion of the AMD 104 closer to the first location; or both a modification to the first distance and the second direction. For example, the fourth distance may be the third distance minus the distance the first portion is outside of the first geographical area and may be a difference between the second distance and the third distance. The third direction may be determined similar to determining the second orientation described with respect to FIG. 9, where the third direction is a direction that would result in the AMD 104 moving into an orientation that would place the first portion of the AMD 104 closer to the first location. The third pose may be based on the one or more modifications to the first distance, the second direction, and the second orientation.

At 1114, the AMD 104 may, move to the third pose, where the third pose is outside the FOV from the one or more sensors 152 at the first pose. For example, based on the second instruction, move the fourth distance in the third direction. For example, motor encoder data may indicate an amount of rotation of each wheel 414 of the AMD 104, where the amount of rotation, given a wheel radius, may be used to determine a distance traveled. The third direction relative to the first direction may be determined based on a difference between a first rotation of a first wheel 414(1) and a second rotation of a second wheel 414(2). The motor encoder data may be used by the motor encoder 310 to move the AMD 104 by a fourth distance in the third direction to the third pose.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) comprising:
a structure;
a sensor having a field-of-view (FOV);
one or more processors;
one or more memories storing computer-executable instructions which, when executed using the one or more processors, cause the AMD to:
move the AMD in a first direction of travel to a first location in a physical space, wherein the first direction of travel is within the FOV of the sensor;
determine a first geographical area associated with the first location, the first geographical area having a first size, wherein the AMD traverses a portion of the first geographical area to reach the first location, wherein the first size is based on a size of the structure, and wherein the first geographical area represents a first region free of obstacles and deemed safe for movement based on the FOV of the sensor;
move the AMD in the first direction of travel to a second location in the physical space;
determine a second geographical area associated with the second location, the second geographical area having a second size, wherein the AMD traverses a portion of the second geographical area to reach the second location, wherein the second size is based on the size of the structure, and wherein the second geographical area represents a second region free of obstacles and deemed safe for movement based on the FOV of the sensor;
determine an instruction to move the AMD in a second direction of travel, wherein the second direction of travel is outside of the FOV of the sensor;

move the AMD in the second direction of travel towards a third location without rotating the AMD such that the second direction of travel is within the FOV of the sensor, wherein the third location is outside of the FOV of the sensor;

determine that a portion of the structure is outside of the first geographical area previously deemed safe for movement and outside of the second geographical area previously deemed safe for movement; and stop movement of the AMD at the third location, responsive to determining that the portion of the structure is outside of the first geographical area previously deemed safe for movement and outside of the second geographical area previously deemed safe for movement.

2. The AMD of claim 1, the one or more processors to further execute the computer-executable instructions to:
determine a fourth location in the physical space associated with the portion of the structure;
determine a first distance between the fourth location and the first location;
determine a second distance between the fourth location and the second location;
determine first data indicating that at least one of the first distance or the second distance is greater than a third distance between the first location and a perimeter of the first geographical area;
determine second data indicating that at least one of the first distance or the second distance is greater than a fourth distance between the second location and a perimeter of the second geographical area; and
determine, based on the first data and the second data, that the portion of the structure is outside of the first geographical area and outside of the second geographical area.

3. The AMD of claim 1, the one or more processors to further execute the computer-executable instructions to:
determine a distance between the first location and the second location;
determine that the distance is greater than a threshold distance; and
wherein, in response to the distance being greater than the threshold distance, the one or more processors execute the computer-executable instructions to determine the second geographical area.

4. A method comprising:
moving a device in a first direction of travel from a first location to a second location, wherein the first direction of travel and the second location are within a first field-of-view (FOV) of a first sensor;
determining a first geographical area associated with the first location, wherein the first geographical area represents a first region free of obstacles and deemed safe for movement based on the first FOV of the first sensor;
determining an instruction to move the device in a second direction of travel, wherein the second direction of travel is outside of the first FOV of the first sensor;
moving the device in the second direction of travel towards a third location without rotating the device such that the second direction of travel is within the first FOV of the first sensor, wherein the third location is outside of the first FOV of the first sensor;
determining that a first portion of the device is outside of the first geographical area previously deemed safe for movement; and stopping the device at the third location, based at least on the first portion of the device being outside of the first geographical area previously deemed safe for movement.

5. The method of claim 4, wherein the first geographical area has been at least in part traversed by the device.

6. The method of claim 4, wherein the first geographical area is determined at a first time, and wherein the method further comprises:
determining, after the first time, that the device has moved in the first direction of travel by a distance greater than a threshold distance; and
determining, in response to the device having moved in the first direction of travel by the distance greater than the threshold distance, a second geographical area, wherein the second geographical area represents a second region free of obstacles and deemed safe for movement based on the first FOV of the first sensor;
wherein the stopping the device is further based on the first portion of the device being outside of the second geographical area.

7. The method of claim 4, further comprising:
determining, using the first sensor, first sensor data associated with the first FOV;
determining that the first sensor data indicates no obstacle is within a second geographical area associated with the first FOV;
determining, using a second sensor, second sensor data associated with a second FOV;
determining that the second sensor data indicates no obstacle is within a third geographical area associated with the second FOV; and
determining, based on the first sensor data and the second sensor data, that the first geographical area comprises at least the second geographical area associated with the first FOV and the third geographical area associated with the second FOV.

8. The method of claim 4, wherein the first geographical area encompasses a footprint of the device.

9. The method of claim 4, wherein:
the first geographical area comprises a circular area and an elliptical area,
a size of the circular area is based on a footprint of the device, and
a size of the elliptical area is based on an aggregated field-of-view of a plurality of sensors of the device, wherein the plurality of sensors includes the first sensor.

10. A method comprising:
moving an autonomous mobile device (AMD) in a first direction of travel to a first location in a physical space, wherein the first direction of travel and the first location are within a first field-of-view (FOV) of a first sensor of the AMD;
determining a first geographical area associated with the first location, wherein the first geographical area represents a first region free of obstacles and deemed safe for movement based on the first FOV of the first sensor;
moving the AMD in the first direction of travel to a second location, wherein the second location is within the first FOV of the first sensor;
determining a second geographical area associated with the second location, wherein the second geographical area represents a second region free of obstacles and deemed safe for movement based on the first FOV of the first sensor;

determining an instruction to move the AMD in a second direction of travel that is outside of the first FOV of the first sensor;

moving the AMD in the second direction of travel towards a third location without rotating the AMD such that the second direction of travel is within the first FOV of the first sensor, wherein the third location is outside of the first FOV of the first sensor;

determining that a portion of a structure of the AMD is outside of the first geographical area previously deemed safe for movement and outside of the second geographical area previously deemed safe for movement; and responsive to the determining that the portion of the structure of the AMD is outside of the first geographical area previously deemed safe for movement and outside of the second geographical area previously deemed safe for movement, stopping movement of the AMD at the third location.

11. The method of claim 10, wherein:
the first geographical area has a first size that is based on a size of the structure of the AMD; and
the second geographical area has a second size that is based on the size of the structure of the AMD.

12. The method of claim 10, wherein:
the AMD traverses a portion of the first geographical area to reach the first location; and
the AMD traverses a portion of the second geographical area to reach the second location.

13. The method of claim 10, further comprising:
determining a fourth location in the physical space associated with the portion of the structure of the AMD;
determining a first distance between the fourth location and the first location;
determining a second distance between the fourth location and the second location;
determining first data indicating that at least one of the first distance or the second distance is greater than a third distance between the first location and a perimeter of the first geographical area;
determining second data indicating that at least one of the first distance or the second distance is greater than a fourth distance between the second location and a perimeter of the second geographical area; and
determining, based on the first data and the second data, that the portion of the structure of the AMD is outside of the first geographical area and outside of the second geographical area.

14. The method of claim 10, further comprising:
moving the AMD to a fourth location;
moving the AMD in the first direction of travel from the fourth location towards a fifth location;
determining that the AMD has moved a distance greater than a threshold distance from the fourth location; and
determining a third geographical area, in response to the AMD having moved the distance that is greater than the threshold distance from the fourth location.

15. The method of claim 10, further comprising:
while the AMD is at the first location:
determining, using the first sensor of the AMD, that there is no obstacle in a third geographical area, and
determining, using a second sensor of the AMD, that there is no obstacle in a fourth geographical area; and
wherein the first geographical area comprises at least the third geographical area associated with the first sensor and the fourth geographical area associated with the second sensor.

16. The method of claim 10, wherein:
the first geographical area comprises a circular area and an elliptical area,
a size of the circular area is based on a footprint of the AMD, and
a size of the elliptical area is based on an aggregated field of view-FOV of a plurality of sensors of the AMD, wherein the plurality of sensors includes the first sensor.

17. The method of claim 10, wherein:
the moving the AMD in the second direction of travel towards the third location is based on the instruction to move the AMD in the second direction of travel that is outside the first FOV of the first sensor of the AMD.

18. The method of claim 10, further comprising:
determining a timestamp for each geographical area.

19. The method of claim 10, wherein:
each geographical area is circular having a radius, and
a center of the each geographical area is associated with a given location.

20. The method of claim 10, wherein:
each geographical area is specified with respect to a reference direction, and
the reference direction is associated with the physical space.

* * * * *

UNITED STATES PATENT AND TRADEMARK OFFICE
CERTIFICATE OF CORRECTION

PATENT NO. : 12,353,211 B1
APPLICATION NO. : 17/447136
DATED : July 8, 2025
INVENTOR(S) : Yue Hu et al.

Page 1 of 1

It is certified that error appears in the above-identified patent and that said Letters Patent is hereby corrected as shown below:

In the Claims

Column 52, Claim 16, Lines 26-27:
Currently read "a size of the elliptical area is based on an aggregated field of view-FOV of a plurality of sensors of the AMD"
Where they should read:
--a size of the elliptical area is based on an aggregated FOV of a plurality of sensors of the AMD--

Signed and Sealed this
Twelfth Day of August, 2025

Coke Morgan Stewart
*Acting Director of the United States Patent and Trademark Office*